(12) United States Patent
Bendre et al.

(10) Patent No.: US 7,920,393 B2
(45) Date of Patent: Apr. 5, 2011

(54) FOUR POLE NEUTRAL-POINT CLAMPED THREE PHASE CONVERTER WITH LOW COMMON MODE VOLTAGE OUTPUT

(75) Inventors: Ashish R. Bendre, Shorewood, WI (US); James C. Vander Meer, Brookfield, WI (US); Robert M. Cuzner, Waukesha, WI (US); Craig Goshaw, Milwaukee, WI (US)

(73) Assignee: DRS Power & Control Technologies, Inc., Milwaukee, WI (US)

( * ) Notice: Subject to any disclaimer, the term of this patent is extended or adjusted under 35 U.S.C. 154(b) by 484 days.

(21) Appl. No.: 12/131,758

(22) Filed: Jun. 2, 2008

(65) Prior Publication Data

US 2008/0298103 A1 Dec. 4, 2008

Related U.S. Application Data

(60) Provisional application No. 60/941,464, filed on Jun. 1, 2007.

(51) Int. Cl.
*H02M 1/12* (2006.01)

(52) U.S. Cl. ............. 363/39; 363/40; 363/44; 363/127; 363/132

(58) Field of Classification Search .............. 363/39, 363/40, 41, 44, 46, 89, 98, 127, 132
See application file for complete search history.

(56) References Cited

U.S. PATENT DOCUMENTS

| | | | | |
|---|---|---|---|---|
| 5,155,675 A | * | 10/1992 | Maruyama et al. | 363/98 |
| 5,321,599 A | * | 6/1994 | Tanamachi et al. | 363/41 |
| 5,517,401 A | * | 5/1996 | Kinoshita et al. | 363/98 |
| 5,572,418 A | | 11/1996 | Kimura et al. | |
| 5,852,558 A | | 12/1998 | Julian et al. | |
| 5,910,892 A | * | 6/1999 | Lyons et al. | 363/98 |
| 6,031,738 A | * | 2/2000 | Lipo et al. | 363/37 |
| 6,392,907 B1 | * | 5/2002 | Ichikawa | 363/98 |
| 6,697,274 B2 | * | 2/2004 | Bernet et al. | 363/132 |
| 7,215,559 B2 | | 5/2007 | Nondahl et al. | |
| 2004/0057262 A1 | * | 3/2004 | Tanaka et al. | 363/132 |
| 2004/0124805 A1 | * | 7/2004 | Edwards et al. | 318/700 |
| 2006/0245216 A1 | * | 11/2006 | Wu et al. | 363/13 |
| 2007/0195567 A1 | * | 8/2007 | Morishita | 363/55 |
| 2008/0298103 A1 | * | 12/2008 | Bendre et al. | 363/89 |
| 2008/0303469 A1 | * | 12/2008 | Nojima | 318/503 |

OTHER PUBLICATIONS

International Search Report dated Aug. 14, 2008 corresponding to PCT/US08/65558.

* cited by examiner

*Primary Examiner* — Jeffrey L Sterrett
(74) *Attorney, Agent, or Firm* — SNR Denton US LLP

(57) ABSTRACT

A four pole, three-phase, NPC converter that produces virtually no common mode voltage. The low common mode voltage output is achieved by constraining the switch states of the NPC converter. A fourth pole and associated control balance the upper and lower DC link voltages. The converter may be an inverter or a rectifier.

16 Claims, 42 Drawing Sheets

FIGURE 14

| Sector | Phase 'a'<br>T1/T2 | Phase 'b'<br>T1/T2 | Phase 'c'<br>T1/T2 |
|---|---|---|---|
| I | $\frac{TO'}{2}+T1' \ / \ T2'$ | $\frac{TO'}{2} \ / \ T1'+T2'$ | $\frac{TO'}{2} \ / \ T1'$ |
| II | $\frac{TO'}{2} \ / \ T1'+T2'$ | $\frac{TO'}{2} \ / \ T1'$ | $\frac{TO'}{2}+T1' \ / \ T2'$ |
| III | $\frac{TO'}{2} \ / \ T1'$ | $\frac{TO'}{2}+T1' \ / \ T2'$ | $\frac{TO'}{2} \ / \ T1'+T2'$ |
| IV | $\frac{TO'}{2}+T1' \ / \ T2'$ | $\frac{TO'}{2} \ / \ T1'+T2'$ | $\frac{TO'}{2} \ / \ T1'$ |
| V | $\frac{TO'}{2} \ / \ T1'+T2'$ | $\frac{TO'}{2} \ / \ T1'$ | $\frac{TO'}{2}+T1' \ / \ T2'$ |
| VI | $\frac{TO'}{2} \ / \ T1'$ | $\frac{TO'}{2}+T1' \ / \ T2'$ | $\frac{TO'}{2} \ / \ T1'+T2'$ |

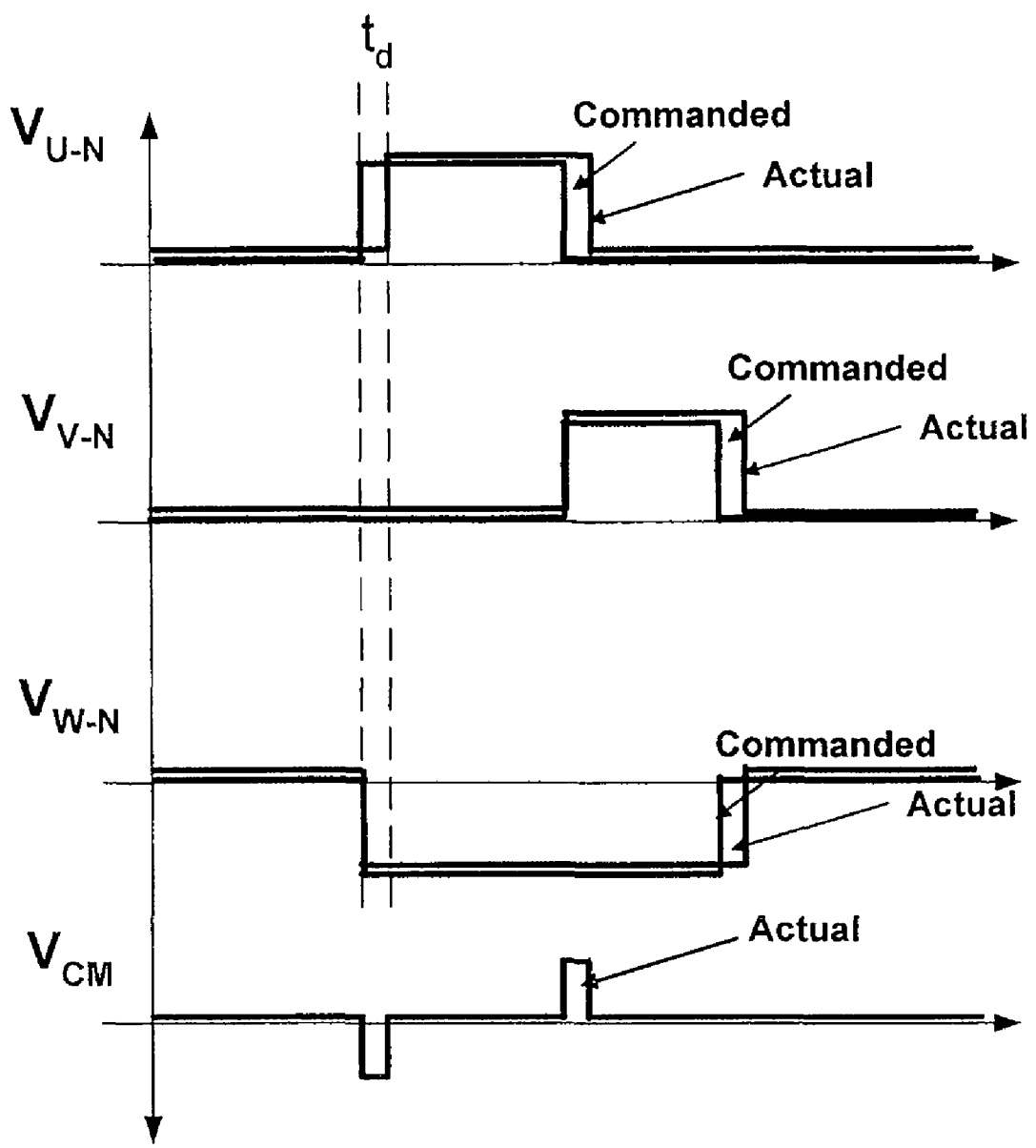

FOUR POLE NEUTRAL-POINT CLAMPED THREE PHASE CONVERTER WITH LOW COMMON MODE VOLTAGE OUTPUT

RELATED APPLICATION DATA

This application claims the benefit of the filing date of U.S. Provisional Application No. 60/941,464, entitled "FOUR POLE NEUTRAL-POINT CLAMPED THREE PHASE INVERTER WITH LOW COMMON MODE OUTPUT VOLTAGE," filed on Jun. 1, 2007, which is incorporated herein by reference to the extent permitted by law.

BACKGROUND OF THE INVENTION

1. Field of the Invention

The present invention generally relates to power converters; and in particular, to a four pole neutral-point clamped three phase converter with zero common mode voltage output.

2. Description of the Related Art

Applications where power electronic converters share the same AC or DC bus with multiple loads require careful attention to the interaction with these loads at the point of common coupling. Whether the application is a variable frequency motor drive, UPS, renewable energy system or a power conversion system that provides service power in a shipboard, aircraft or other transportation platform, certain interface standards must be met. These interface standards include those that govern the Electromagnetic Compatibility ("EMC"), power quality and transient performance.

Additionally, successful integration of these systems requires further insight into how the power electronics and associated loads and sources interact on a common bus. Furthermore, innovative circuit topologies and control techniques are needed to make these systems compatible without incurring the cost and weight of additional components, such as harmonic filters and EMI filters.

SUMMARY OF THE INVENTION

Methods and systems consistent with the present invention provide a four pole neutral-point clamped ("NPC") three phase converter that produces virtually no common mode voltage. The converter may be, for example, an inverter or a rectifier. The low common mode voltage output is achieved by constraining the switch states of the NPC converter. This performance is achieved at the expense of loss of DC link voltage balance control. However, a fourth pole and associated control are added to balance the upper and lower DC link voltages.

In an illustrative example, a 450V, 78 kW DC to AC inverter may be applied as the power source to an AC grid having multiple loads. The illustrative inverter derives its power from some other DC source, such as but not limited to a battery supply, isolated generator, AC to DC transformer-rectifier, and the like. In another illustrative example, the converter may be a rectifier that interfaces with a MIL-STD-1399 bus for providing power on a ship.

In accordance with devices consistent with the present invention, a three-level neutral point clamped converter is provided. The converter comprises a first pole; a second pole; a third pole; a fourth pole; and a controller. Each of the first, second, and third poles have a first switch, a second switch, a third switch, and a fourth switch coupled in series between a positive DC bus and a negative DC bus. The fourth pole has a first switch and a second switch coupled in series between the positive DC bus and the negative DC bus. An AC bus is connected between the second switch and the third switch of the first, second, and third poles. A neutral line is connected through a diode between the first switch and the second switch and between the third switch and the fourth switch of the first, second, and third poles. The first and second switches define an upper portion, the third and fourth switches defining a lower portion. The controller switches states of the respective first, second, third, and fourth switches of the first, second, and third poles to produce zero common mode voltage, the fourth pole enabling all of the NPC switch states of the first, second, and third poles to be used for producing zero common mode voltage. The controller also modulates the first and second switches of the fourth pole to balance the positive DC bus and the negative DC bus. The fourth pole may have a first switch, a second switch, a third switch, and a fourth switch coupled in series between a positive DC bus and a negative DC bus or a first switch and a second switch coupled between a positive DC bus and negative DC bus.

In accordance with methods consistent with the present invention, a method for controlling a three-level neutral point clamped converter is provided. The converter has a first pole; a second pole; a third pole; and a fourth pole. Each of the first, second, and third poles has a first switch, a second switch, a third switch, and a fourth switch coupled in series between a positive DC bus and a negative DC bus. The fourth pole has a first switch and a second switch coupled in series between the positive DC bus and the negative DC bus. An AC bus is connected between the second switch and the third switch of the first, second, and third poles. A neutral line is connected through a diode between the first switch and the second switch and between the third switch and the fourth switch of the first, second, and third poles. The first and second switches define an upper portion. The third and fourth switches defining a lower portion. The method comprises the steps of: switching states of the respective first, second, third, and fourth switches of the first, second, and third poles to produce zero common mode voltage, the fourth pole enabling all of the NPC switch states of the first, second, and third poles to be used for producing zero common mode voltage; and modulating the first and second switches of the fourth pole to balance the positive DC bus and the negative DC bus. The fourth pole may have a first switch, a second switch, a third switch, and a fourth switch coupled in series between a positive DC bus and a negative DC bus or a first switch and a second switch coupled between a positive DC bus and negative DC bus.

BRIEF DESCRIPTION OF THE DRAWINGS

The accompanying drawings, which are incorporated in an ?? constitute a part of this specification, illustrate an implementation of the invention and, together with the description, serve to explain the advantages and principles of the invention.

FIG. 14 is a table of mapping values from a 2-level inverter T1', T2' to a ZCM modulated NPC inverter T1, T2.

FIG. 15 shows output pole voltages and common mode voltage including dead time effect for Ia>0, Ib<0, and Ic>0.

Corresponding reference characters indicate corresponding parts throughout the several views of the drawings.

DETAILED DESCRIPTION OF THE INVENTION

Figure 1:
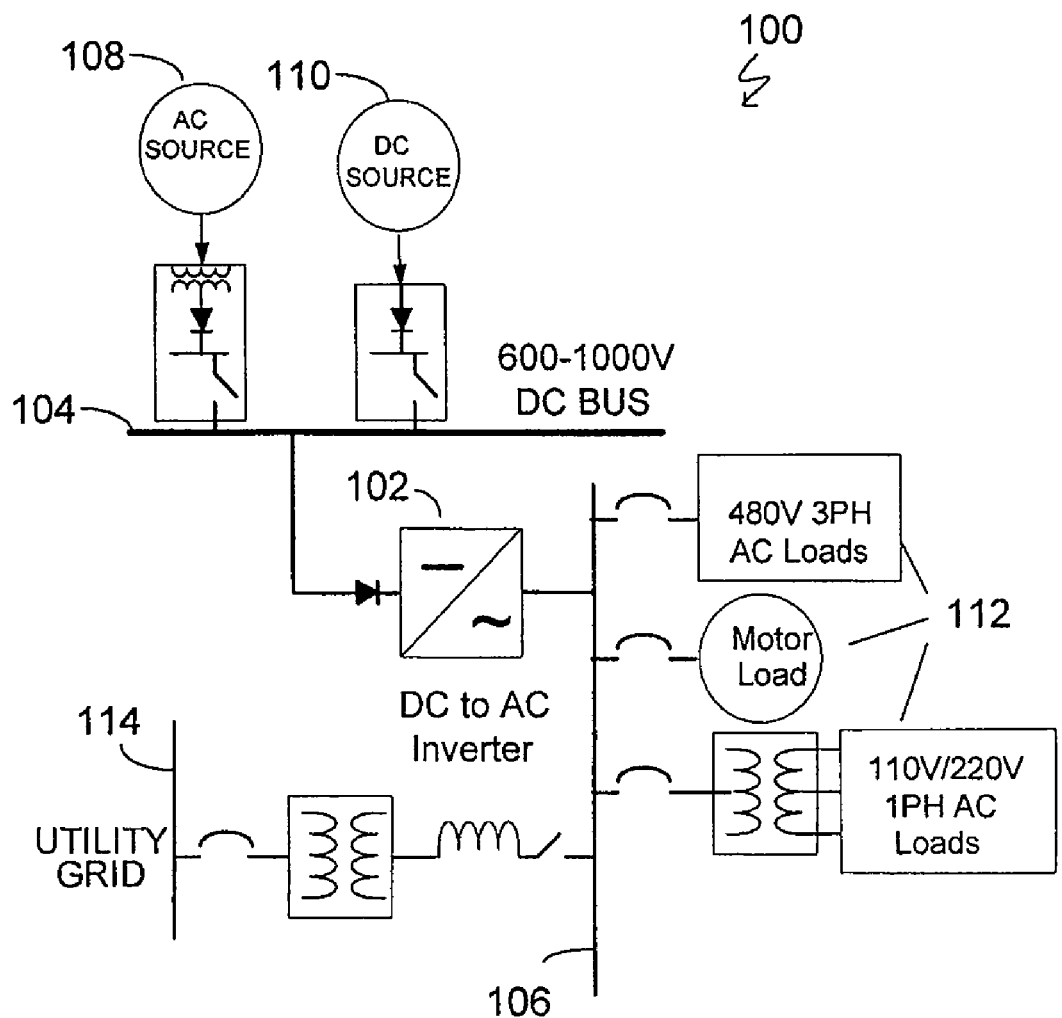
FIG. 1 is a schematic diagram that depicts a DC micro-grid system.

Reference will now be made in detail to a four pole, three-phase, NPC converter consistent with the present invention as illustratively presented in the accompanying drawings. The illustrative converter produces virtually no common mode voltage. The low common mode voltage output is achieved by constraining the switch states of the NPC converter. This performance is achieved at the expense of loss of DC link voltage balance control. However, a fourth pole and associated control are added to balance the upper and lower DC link voltages. In an illustrative example, a converter consistent with the present invention is described as an inverter. This example is merely illustrative. One having skill in the art will appreciate that methods and systems consistent with the present invention are not limited thereto and may be implemented, for example, in a rectifier. Another illustrative example is also presented below, which describes a four pole, three-phase, NPC rectifier consistent with the present invention.

I. The Problem of Common Mode Voltage

Common mode voltage is the sum of the voltages produced at each power line of a switching power converter measured with respect to some common point, such as ground. The production of common mode voltage is an inherent problem with power converters and is a byproduct, for example in inverters of the method by which AC voltages are synthesized from a DC voltage by force-commutated switches, such as insulated-gate bipolar transistors ("IGBT") or metal-oxide semiconductor field-effect transistors ("MOSFET"). If the inverter produces a voltage that is applied to a motor, this common mode voltage may be a contributor to the mechanisms which cause bearing failure. If an active rectifier is implemented or the inverter is producing or contributing to the voltage on an AC bus, then the common mode voltage may be a major contributor to conducted EMI into a power grid.

Increasingly, DC to AC Inverters are being proposed to provide three phase power to power grids, such as in DC micro-grid systems where a renewable energy source feeds a DC bus and power from this DC bus is distributed to AC loads through a DC to AC inverter, which also provides a connection to a utility power grid. Similar systems are being developed for shipboard integrated power systems and for distributed industrial power networks.

The production of common mode voltage introduces additional complications in these types of systems because they typically provide power to a large number of existing loads that were traditionally fed by sire-wave AC power measured from both line-to-line and from line-to-ground. The common mode voltage can have a very undesirable impact on the voltage to ground stresses applied to the AC loads connected to a DC-to-AC inverter fed bus, especially in a floating system, which maintains electrical isolation between each of the DC bus power lines and earth ground. Such a floating system is often required in order to improve fault tolerance.

Figure 2:
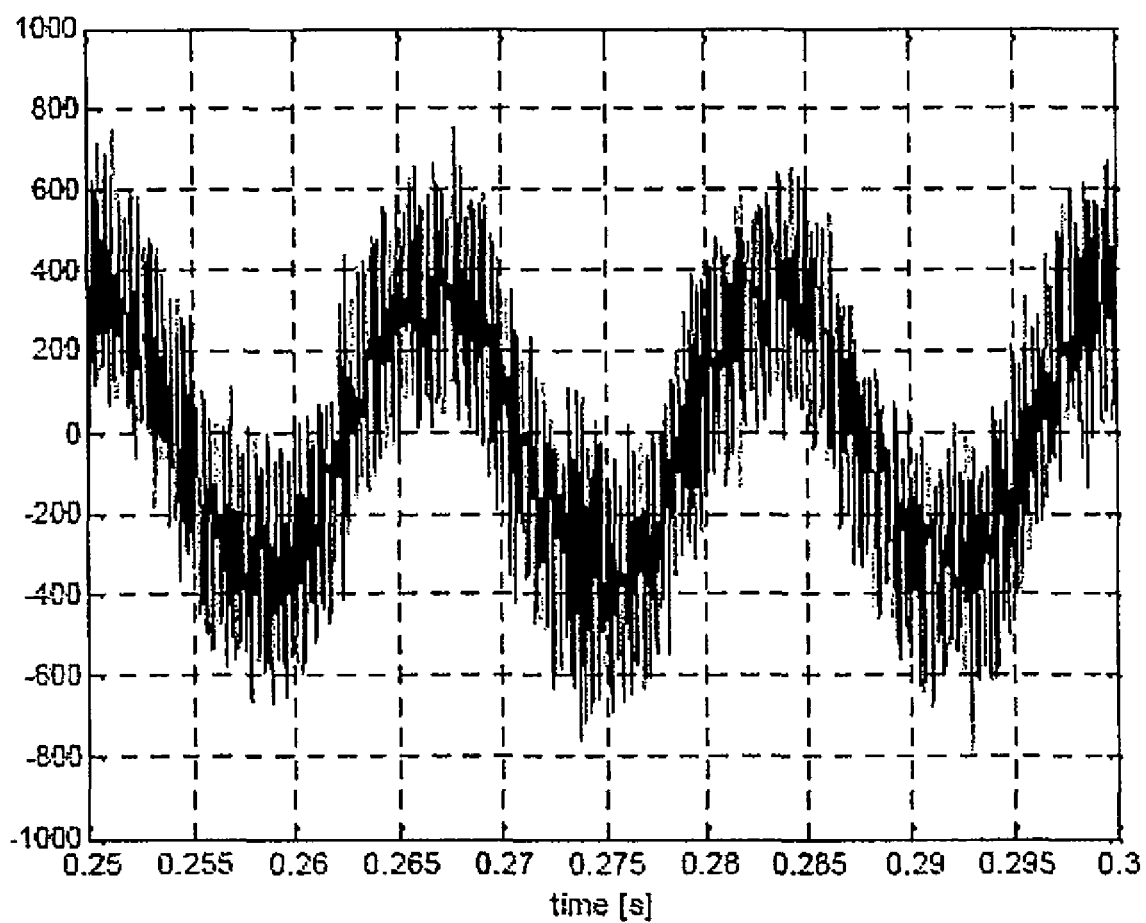
FIG. 2 shows a voltage to ground signal produced by a conventional NPC inverter with Nearest Three Vector ("NTV") modulation.

This problem of voltage to ground stress at the loads is illustrated by consideration of the DC micro-grid system 100 shown in FIG. 1. A conventional DC to AC inverter 102 includes a three phase NPC inverter with a sine-wave, differential mode output filter. The inverter 102 is electrically coupled to a DC bus 104 and an AC bus 106. The DC bus is fed from one or more sources 108 and 110. One or more loads 112 and a power grid 114 may be connected to the AC bus 106. The line to line voltage applied to the AC bus 106, to which the loads 112 are connected is sinusoidal but the line to ground voltage applied to the loads 112 has a common mode voltage riding on top of it which causes additional voltage stress for which the load 112 insulation system is typically not designed. The problem is further compounded by any capacitance to ground that exists at the load 112 which, when combined with cable inductance between the source 108 or 110 and load 112 can excite a resonance and result in amplification of voltage to ground seen at the load 112. FIG. 2 depicts simulated voltage to ground at the load 112 of FIG. 1. As shown, there is voltage stress at the load 112. This additional voltage stress can lead to insulation breakdown at the loads. Re-design of the loads 112 to accommodate the higher voltage to ground stresses would be a costly and prohibitive alternative.

Conventional systems have looked at constraining the switch states so that no common mode voltage is produced. In a three-phase 2-level inverter it is impossible to produce an output voltage without producing common mode voltage unless an additional pole is added with an additional power pole. The zero state produced by the three phases connected to the load is avoided and the additional pole selects a switch state that forces the common mode voltage to be zero. The additional pole output can be connected to a common output filter point (i.e., ground) or fed back to the mid-point of the DC link through an inductor. Zero common mode voltage on a 2-level inverter comes with a serious degradation of the differential mode voltage because the zero states cannot be utilized.

Methods and systems consistent with the present invention provide an NPC converter, which produces low common mode voltage when compared to conventional 2-level converters. In an NPC inverter, for example, the common mode voltage may be eliminated through proper state selection, without the addition of a balancing pole. This capability is understood by consideration of the hexagonal representation of the illustrative NPC inverter switch states shown in FIG. 3.

Several carrier and space vector based modulation strategies have been proposed for conventional three phase three-level converters. These conventional strategies were designed to provide adjacent state switching action in the converter, which yields the lowest possible output voltage and current total harmonic distortion. While switching frequency common mode voltage and the resulting EMI is unavoidable in two-level converters, it can be eliminated in three-level converters by proper choice of states. The conventional space vector and carrier methods do not achieve this as they are exclusively focused on output voltage synthesis.

Figure 3:
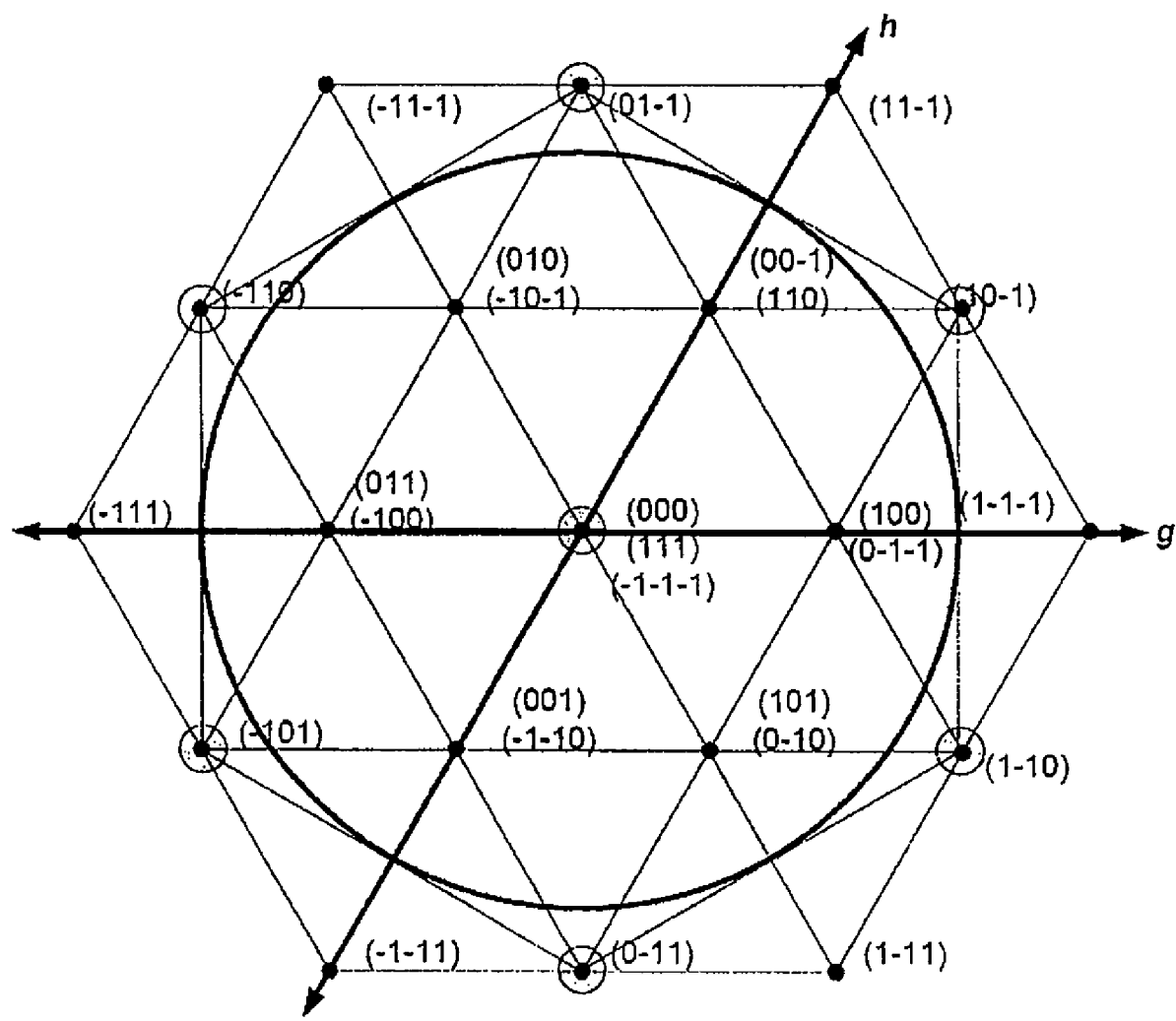
FIG. 3 is a state diagram that shows switching states of an NPC inverter with zero common mode states circled.

Referring to the states in FIG. 3, the common mode voltages associated with the various states in the diagram can be calculated and are shown in the second column of Table 1.

TABLE 1

| State | CM voltage | CM voltage $V_{DC}$~1pu $V_0$~0 |
|---|---|---|
| −1−1−1 | $-(V_{DC}/2)$ | $-\frac{1}{2}$ |
| −1−10 | $-(\frac{1}{3})V_{DC} + (\frac{1}{3})V_0$ | $-\frac{1}{3}$ |
| −1−11 | $-(\frac{1}{6})(V_{DC}/2)$ | $-\frac{1}{6}$ |
| −10−1 | $-(\frac{1}{3})V_{DC} + (\frac{1}{3})V_0$ | $-\frac{1}{3}$ |
| −100 | $-(\frac{1}{6})V_{DC} + (\frac{2}{3})V_0$ | $-\frac{1}{6}$ |
| −101 * | $(\frac{1}{3})V_0$ | 0 |
| −11−1 | $-(\frac{1}{6})(V_{DC}/2)$ | $-\frac{1}{6}$ |
| −110 * | $(\frac{1}{3})V_0$ | 0 |
| −111 | $(\frac{1}{6})(V_{DC}/2)$ | $+\frac{1}{6}$ |
| 0−1−1 | $-(\frac{1}{3})V_{DC} + (\frac{1}{3})V_0$ | $-\frac{1}{3}$ |
| 0−10 | $-(\frac{1}{6})V_{DC} + (\frac{2}{3})V_0$ | $-\frac{1}{6}$ |
| 0−11 * | $(\frac{1}{3})V_0$ | 0 |
| 00−1 | $-(\frac{1}{6})V_{DC} + (\frac{2}{3})V_0$ | $-\frac{1}{6}$ |
| 000 * | $V_0$ | 0 |
| 001 | $(\frac{1}{6})V_{DC} + (\frac{2}{3})V_0$ | $+\frac{1}{6}$ |
| 01−1 * | $(\frac{1}{3})V_0$ | 0 |
| 010 | $(\frac{1}{6})V_{DC} + (\frac{2}{3})V_0$ | $+\frac{1}{6}$ |
| 011 | $(\frac{1}{3})V_{DC} + (\frac{1}{3})V_0$ | $+\frac{1}{3}$ |
| 1−1−1 | $-(\frac{1}{3})(V_{DC}/2)$ | $-\frac{1}{6}$ |
| 1−10 * | $(\frac{1}{3})V_0$ | 0 |
| 1−11 | $(\frac{1}{3})(V_{DC}/2)$ | $+\frac{1}{6}$ |
| 10−1 * | $(\frac{1}{3})V_0$ | 0 |
| 100 | $(\frac{1}{6})V_{DC} + (\frac{2}{3})V_0$ | $+\frac{1}{6}$ |
| 101 | $(\frac{1}{3})V_{DC} + (\frac{1}{3})V_0$ | $+\frac{1}{3}$ |
| 11−1 | $(\frac{1}{3})(V_{DC}/2)$ | $+\frac{1}{6}$ |
| 110 | $(\frac{1}{3})V_{DC} + (\frac{1}{3})V_0$ | $+\frac{1}{3}$ |
| 111 | $(V_{DC}/2)$ | $+\frac{1}{2}$ |

As shown in Table 1, seven states in the three-level converter switching diagram generate common mode voltage that is dependent only on $V_0$, which is a measure of the unbalance between the DC buses. The common mode voltage generated for $V_{DC}=1$ p.u. and perfectly balanced DC buses ($V_0=0$) is shown in the third column of Table 1. The seven states with low common mode voltage are highlighted with an asterisk (*) and identified by the circled states in FIG. 3.

Since a minimum of seven independent states are only required to produce output voltage, redundant states offer opportunities to balance the upper and lower DC link voltages and provide improvements to the output waveform quality, by enabling an effective doubling of frequency. If only the circled states are utilized, then the NPC inverter produces zero common mode voltage. The peak attainable voltage magnitude is limited to the inscribed circle in the hexagon created by these six zero common mode voltage states as shown in FIG. 3. This comes at a cost, however, because the voltage utilization is reduced to 86.6% of the full potential utilization of the NPC inverter, which impacts differential mode waveform quality, the DC link voltages are not balanced, and the frequency doubling effect is effectively lost. Methods and systems consistent with the present invention overcome these costs by providing an NPC inverter with adequate differential mode performance by the means of increasing DC voltage and differential mode filter design, mitigated common mode voltage with fewer or no filters, and an additional pole to balance the DC link voltages.

Figure 4A:
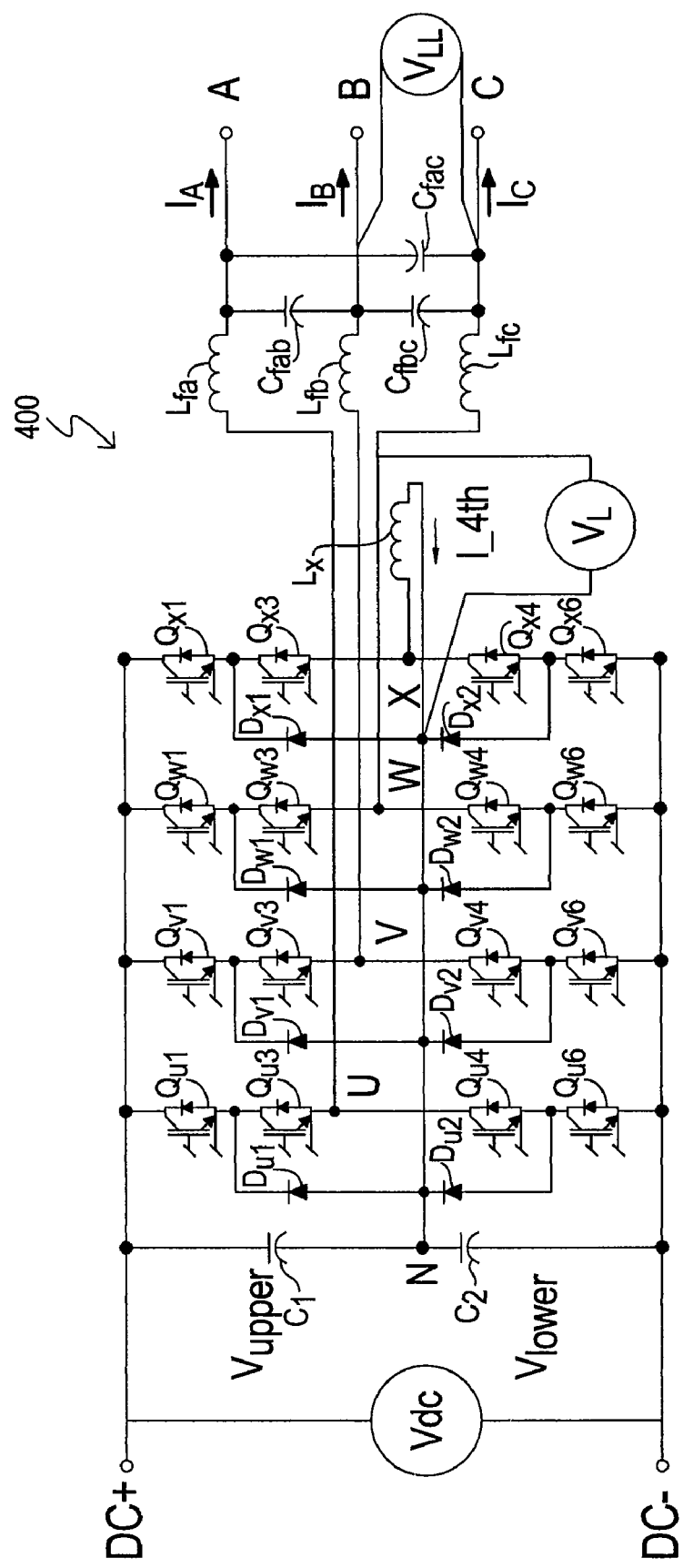
FIG. 4A is a schematic diagram of an inverter consistent with the present invention.

FIG. 4A shows a topology of an illustrative NPC inverter 400 consistent with the present invention. The illustrative inverter 400 includes four poles U, V, W, and X, where X is an additional pole that balances DC link voltages. The inverter 400 converts a DC input voltage Vdc to three-phase AC output voltages Va, Vb, and Vb. A DC bus capacitor $C_1$ is coupled between the DC+pole and neutral in the upper stage. A DC bus capacitor $C_2$ is coupled between the DC−pole and neutral in the lower stage.

Each pole U, V, W, and X of the inverter 400 includes a pair of switches Q1 and Q3 in the upper stage and a pair of switches Q4 and Q6 in the lower stage. The switches may be a variety of switch types, such as IGBT, MOSFETs, and the like. In the illustrative example, the switches are IGBTs. Each switch Q includes a diode coupled in parallel with the switch. As shown in the illustrative example, pole U includes switches Qu1 and Qu3 in series in the upper stage, and switches Qu4 and Qu6 in series in the lower stage. Diode Du1 is coupled in parallel between switches Qu1 and Qu3 and neutral. Diode Du2 is coupled in parallel between switches Qu4 and Qu6 and neutral. Regarding pole V, pole V includes switches Qv1 and Qv3 in series in the upper stage, and switches Qv4 and Qv6 in series in the lower stage. Diode Dv1 is coupled in parallel between switches Qv1 and Qv3 and neutral. Diode Dv2 is coupled in parallel between switches Qv4 and Qv6 and neutral. Regarding pole W, pole W includes switches Qw1 and Qw3 in series in the upper stage, and switches Qw4 and Qw6 in series in the lower stage. Diode Dw1 is coupled in parallel between switches Qw1 and Qw3 and neutral. Diode Dw2 is coupled in parallel between switches Qw4 and Qw6 and neutral. Regarding pole X, pole X includes switches Qx1 and Qx3 in series in the upper stage, and switches Qx4 and Qx6 in series in the lower stage. Diode Dx1 is coupled in parallel between switches Qx1 and Qx3 and neutral. Diode Dx2 is coupled in parallel between switches Qx4 and Qx6 and neutral. Pole X further includes an inductor Lx coupled in parallel between switches Qx3 and Qx4 and neutral.

Figure 4B:
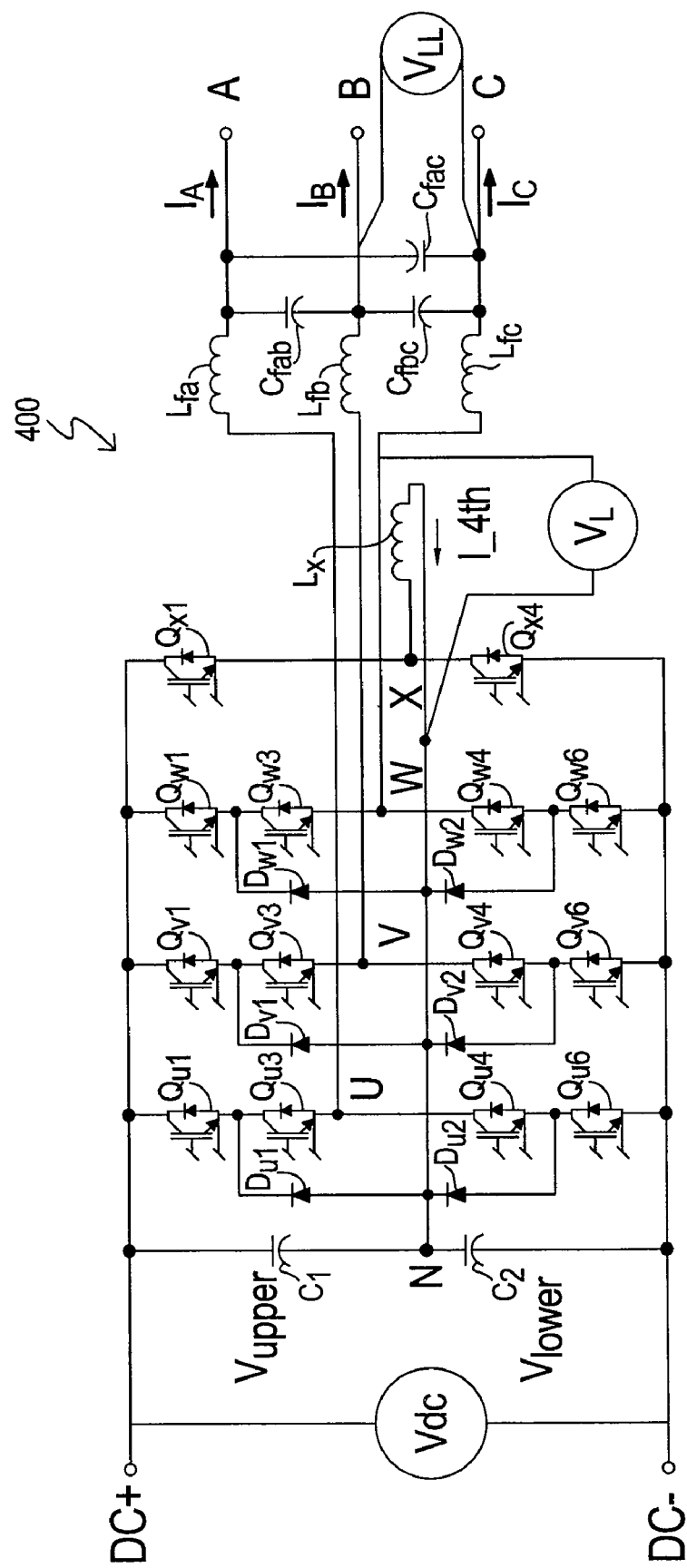
FIG. 4B is a schematic diagram of another inverter consistent with the present invention.

Alternatively, the fourth pole may be implemented, for example, as a two-level pole, which has either one switch in the upper portion and one switch in the lower portion, or two or more switches in each of the upper and lower portions where the switches in the respective upper and lower portions are switched at the same time. This implementation is shown in FIG. 4B. In this case, the fourth pole does not need to be neutral point clamped via a diode. For example, the fourth pole Qu1 and Qu3 may switch on at the same time alternating with Qu2 and Qu4 while no current flows through the diodes. Alternatively, the fourth pole may have only Qu1 in the upper portion and only Qu4 in the lower portion.

Each output phase includes a load voltage filter inductor Lf coupled in parallel with a load voltage filter capacitor Cf. In the illustrative inverter 400, output phase A includes a load voltage filter inductor Lfa coupled in parallel with a load voltage filter capacitor Cfab, which is coupled in parallel between phase A and phase B. Output phase B includes a load voltage filter inductor Lfb coupled in parallel with a load voltage filter capacitor Cfbc, which is coupled in parallel between phase B and phase C. Output phase C includes a load voltage filter inductor Lfc coupled in parallel with a load voltage filter capacitor Cfac, which is coupled in parallel between phase A and phase C.

Figure 5:
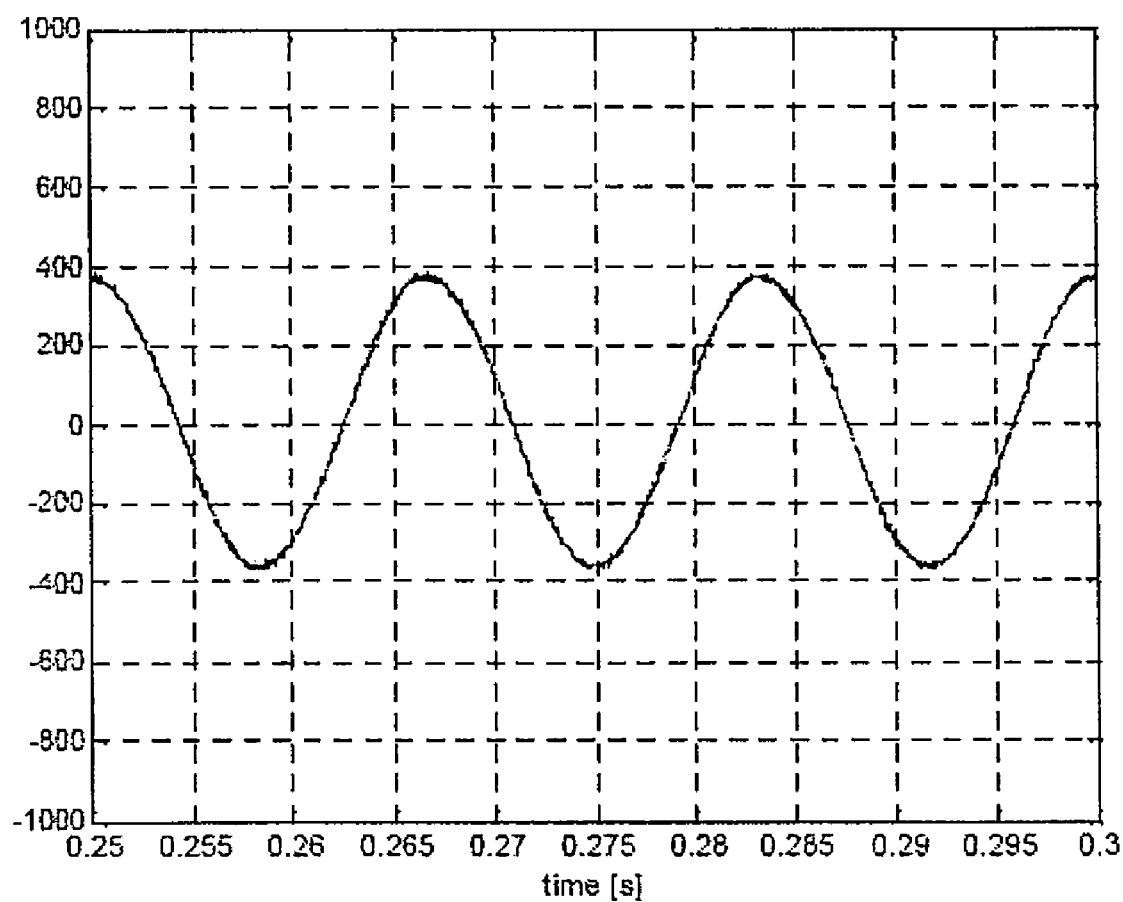
FIG. 5 shows a voltage to ground signal produced by an NPC inverter with ZCM modulation.
Figure 6:
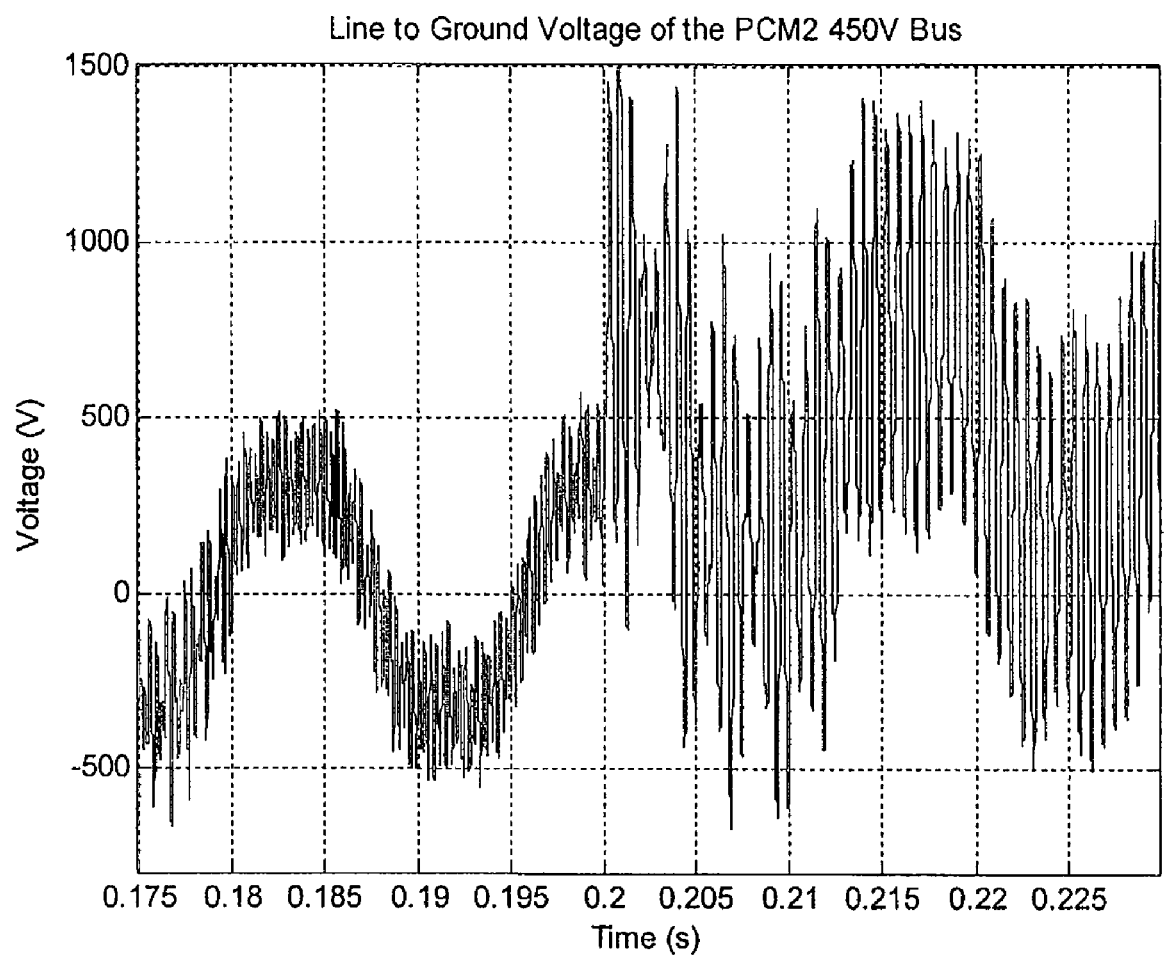
FIG. 6 shows a voltage to ground signal for a conventional 2-level inverter.
Figure 7:
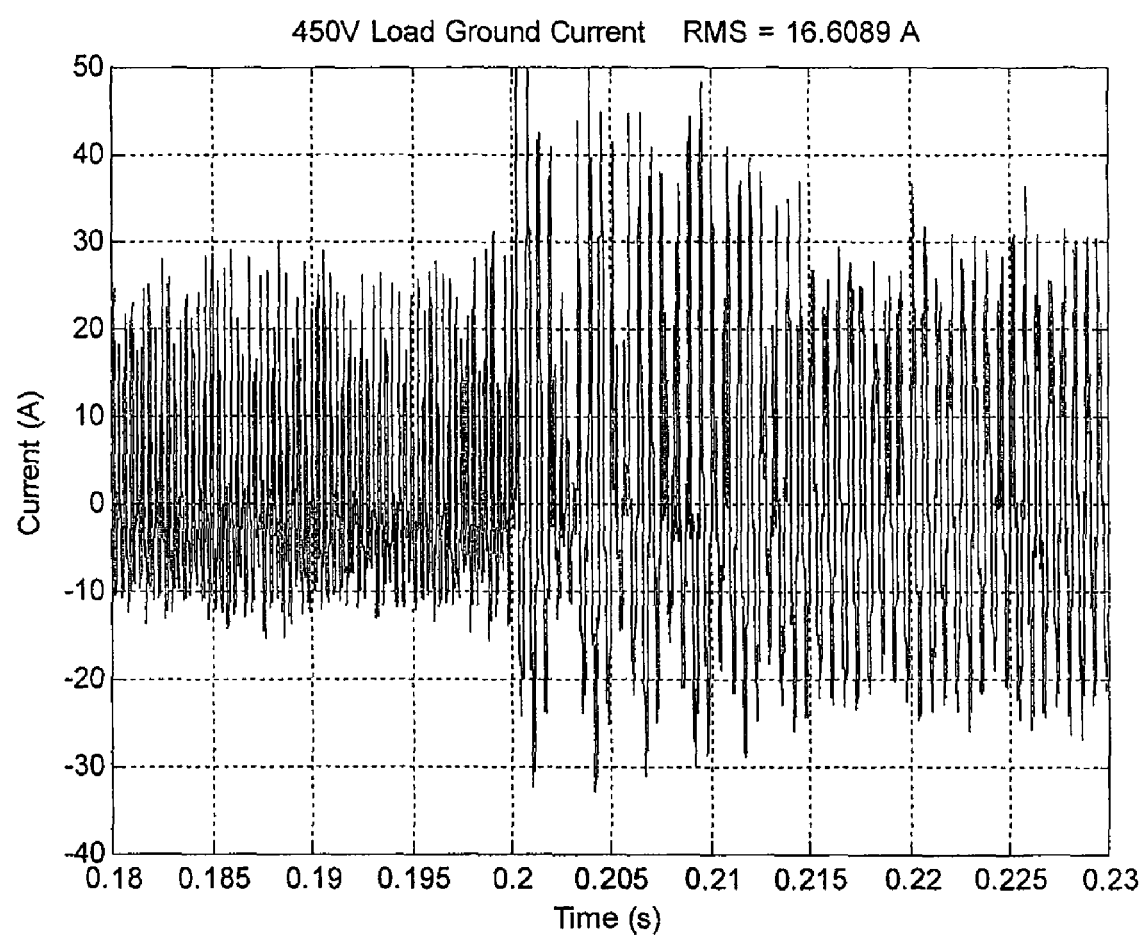
FIG. 7 shows a load ground current for a conventional 2-level inverter.
Figure 8:
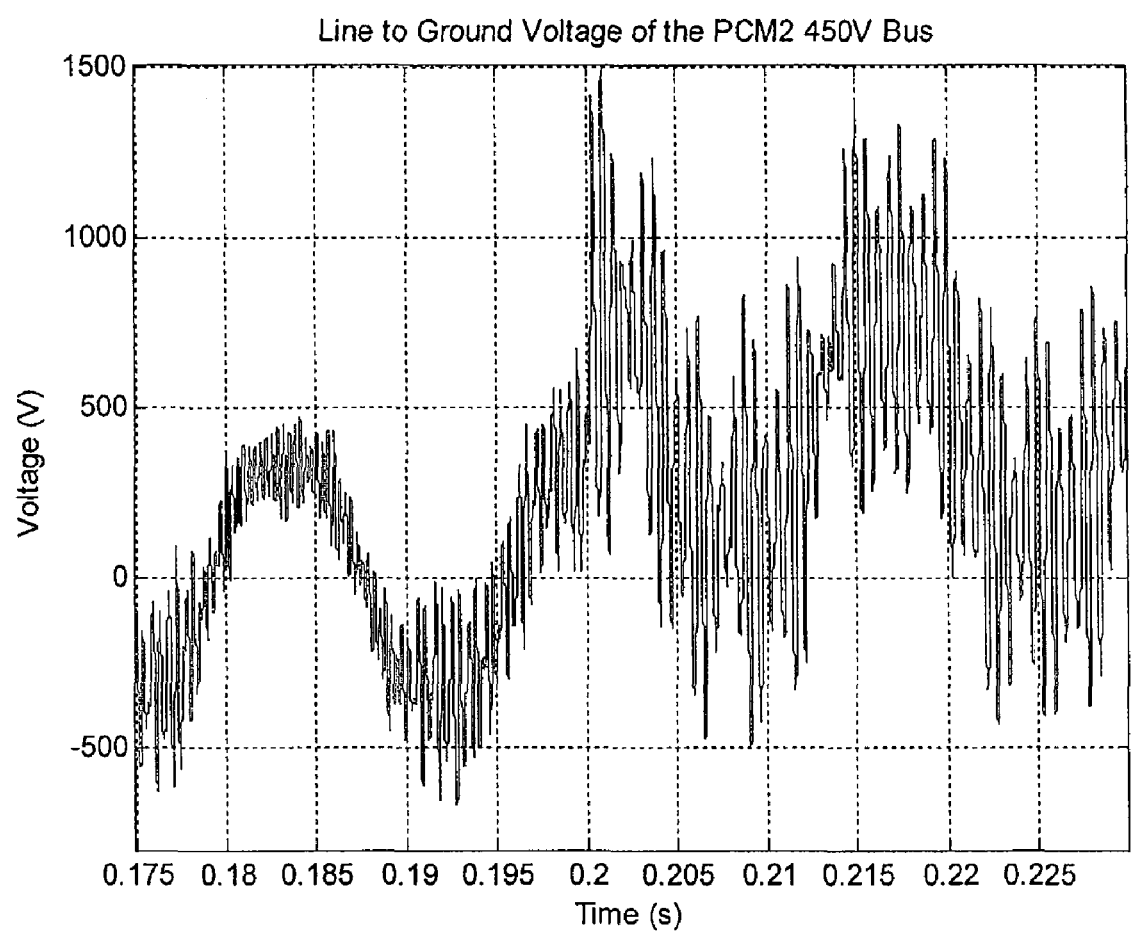
FIG. 8 shows a voltage to ground signal for a conventional NPC inverter.
Figure 9:
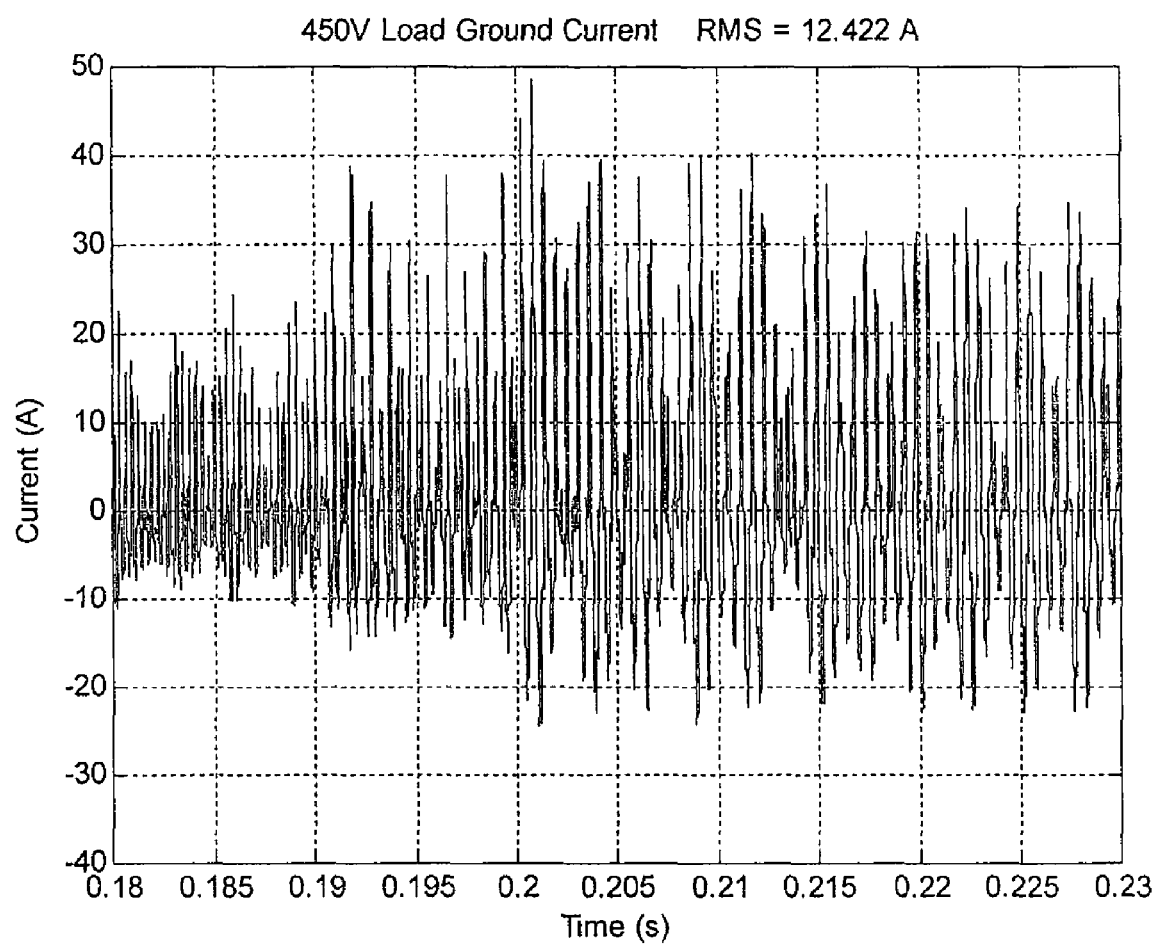
FIG. 9 shows a load ground current for a conventional NPC inverter.

As will be described in more detail below, the inverter 400 incorporates a Zero Common Mode (ZCM) modulation scheme. FIG. 5 shows a voltage to ground produced by an NPC inverter with ZCM modulation, where the voltage to ground is applied to the loads in a DC micro-grid system (e.g., the system of FIG. 1 with the inverter 400 substituted) using the seven circled states of FIG. 3. Comparing the results in FIG. 5 with the voltage to ground of a conventional system in FIG. 2, the voltage to ground stress due to common mode voltage is eliminated.

Figure 10:
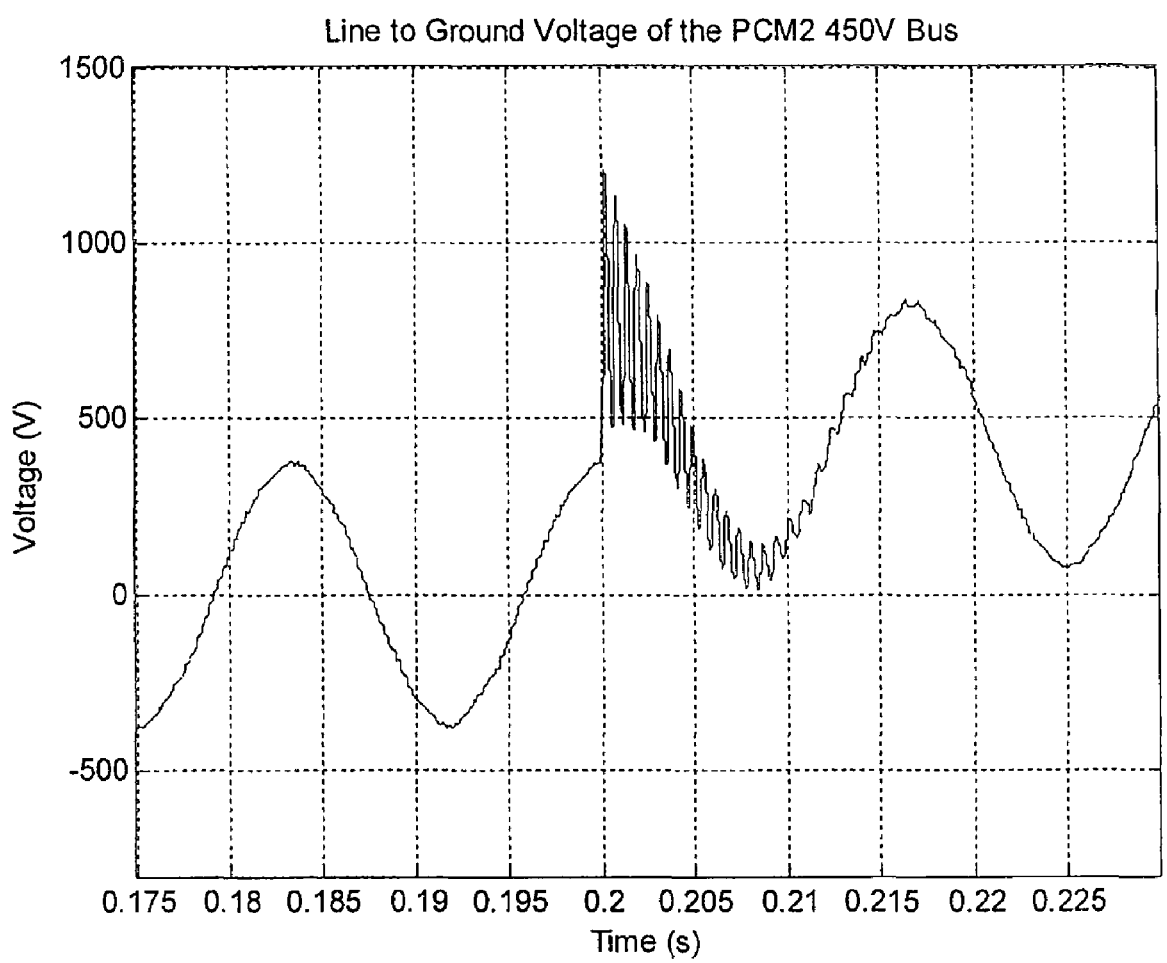
FIG. 10 shows a voltage to ground signal for an NPC inverter with ZCM modulation.
Figure 11:
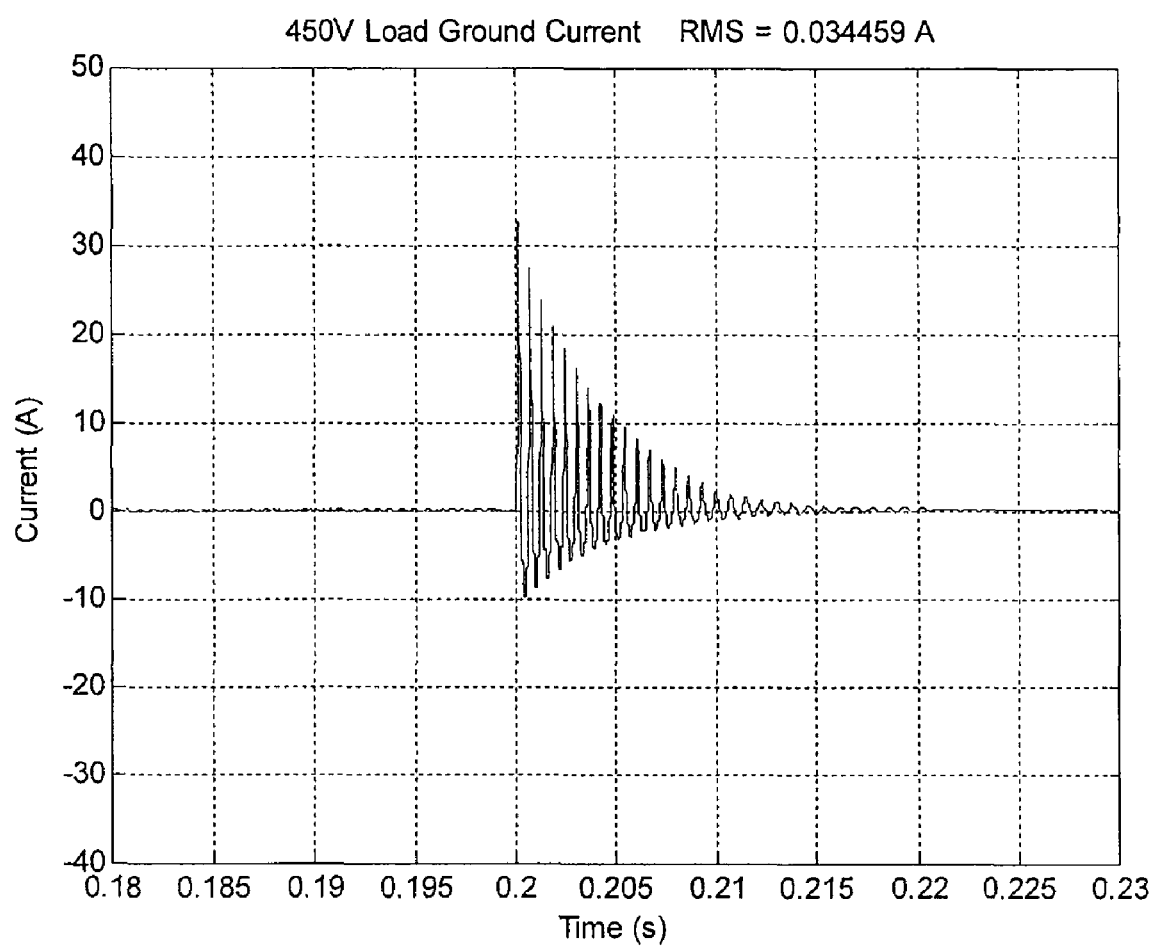
FIG. 11 shows a load ground current for an NPC inverter with ZCM modulation.

The advantages of ZCM modulation are emphasized when the voltage to ground stresses are encountered during a ground fault on the DC bus, with capacitance to ground at the load, in a floating system. FIGS. 6-11 show voltage to ground and load ground current for a conventional 2-level inverter (FIGS. 6 and 7), a conventional NPC inverter (FIGS. 8 and 9), and inverter 400 that incorporates ZCM modulation (FIGS. 10 and 11). In each of FIGS. 6-11, the voltage to ground is applied to the loads in a DC micro-grid system (e.g., the system of FIG. 1 with the respective inverter substituted) using the seven circled states of FIG. 3. Comparing the result in FIGS. 10 and 11 with the voltage to ground and load ground current of the conventional systems, the results show a marked improvement, even when capacitance to ground is applied at the load.

Further, as will be described in more detail below, the inverter 400 that incorporates ZCM modulation exhibits advantages over conventional inverters that utilize common mode filtering, particularly with the higher the power of the system. The size, weight and cost of additional filter components are more significant than the size, weight and cost of the additional components required for ZCM modulation as the power requirement goes up. There are the also additional complications of paralleling inverters in order to implement higher power systems and controlling the remnant high frequency conducted and radiated emissions into the AC bus and adjacent equipment when the common mode voltage is only attenuated by filtering as opposed to being mitigated at the source using ZCM modulation.

II. Zero Common Mode Voltage Modulation

In the illustrative example, the implementation of ZCM modulation for the inverter 400 utilizes only those states which result in the sum of the instantaneous voltages produced by each inverter pole adding to zero. For example, the inverter pole voltage will be either +Vdc/2, 0 or −Vdc/2.

If the phase 'a' pole has selected the '+1' state, the phase 'b' pole has selected the '0' state and the phase 'c' pole has selected the '−1' state, then the common mode voltage is $$Vcm = \frac{+Vdc}{6} + 0 + \frac{-Vdc}{6} = 0$$

These states are those that are circled in FIG. 3. A simple implementation of this modulation scheme can be arrived at by recognizing that only seven switch states are allowed, just as is the case for a 2-level inverter. The 2-level inverter allows only the pole voltages of +Vdc/2 and −Vdc/2, which correspond to switch states of '+1' or '−1'. A mapping between the seven states of a conventional 2-level inverter to the seven ZCM states of inverter 400 is shown in Table 2.

TABLE 2

| 2-level state | 3-level state |
|---|---|
| −1−1−1 | 000 |
| −1−11 | −101 |
| −11−1 | 01−1 |
| −111 | 110 |
| 1−1−1 | −101 |
| 1−11 | 0−11 |
| 11−1 | 1−10 |
| 111 | 111 |

Figure 12:
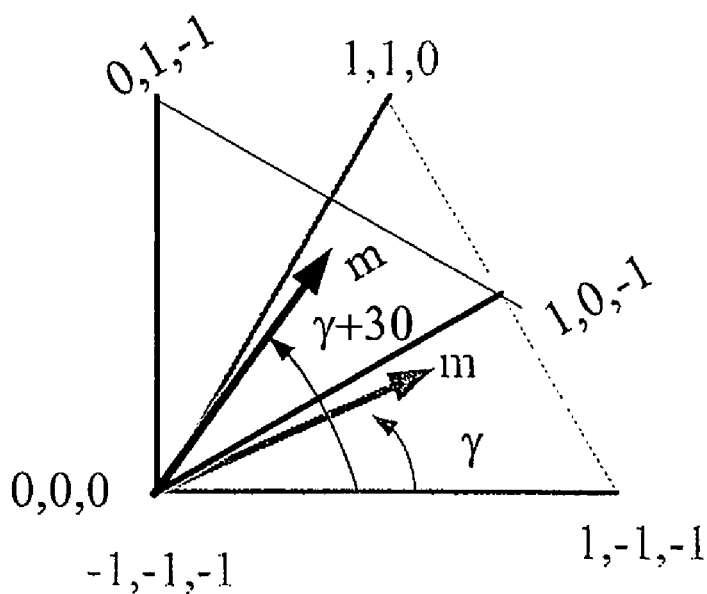
FIG. 12 shows a space vector modulation implementation mapped into the ZCM modulator.
Figure 13:
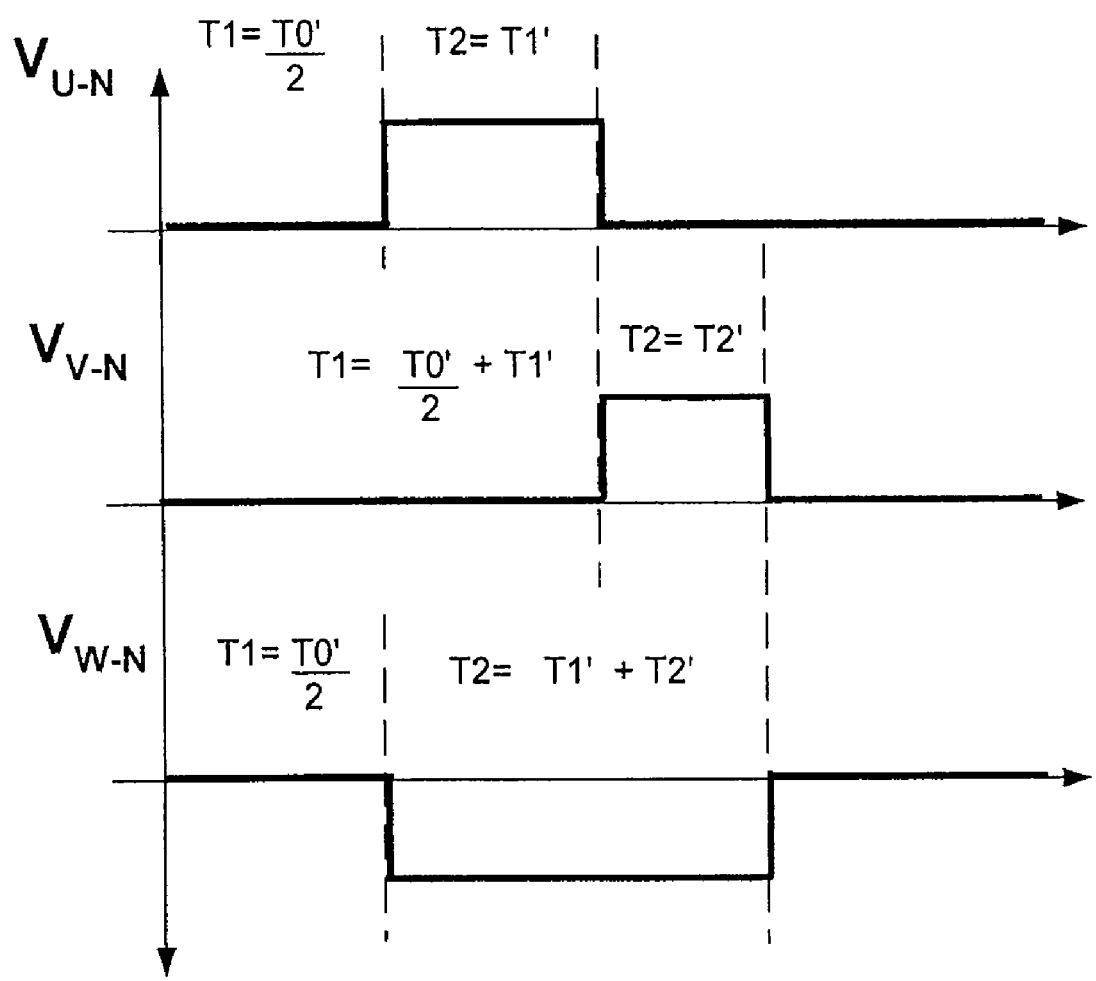
FIG. 13 shows the ZCM modulated MPC inverter pole voltages.

The ZCM modulation is achieved by implementing a 2-level modulation scheme which ensures full utilization of the DC bus voltage, such as Sine-Triangle modulation with 3rd Harmonic Injection or Space Vector Modulation (SVM) and then mapping the 2-level states into the 3-level states shown in Table 2. In the illustrative example, an SVM modulation scheme is implemented. An implementation of ZCM modulation using the SVM approach is described with reference to FIG. 12. In the illustrative example, the dwell times at the two adjacent states of a 2-level inverter are calculated from the reference vector, having magnitude 'm', rotating at the angle γ=ωt, where 'ω' is the commanded output frequency and 'm' is the per-unitized command phase voltage. These dwell times, T1' and T2' are then converted to the on times for the inverter upper-upper device and upper-lower device (Q1 and Q4 in FIG. 4 for each phase). The three pole voltages and the conversion of T1', T2' and T0' to T1, T2 for all three phases while in designated Sector VI is shown in FIG. 13.

FIG. 14 shows the mapping of T1', T2' and T0' into T1/T2 for all six sectors for the illustrative SVM implementation.

The ZCM modulation is controlled by the controller, which is described below. As described below, the illustrative controller is implemented as a field programmable gate array and a digital signal processor. However, the controller may alternatively be implemented as a data processing system and the like.

III. Dead Time Compensation

In an inverter it is typically impossible to achieve completely zero common mode voltage output because dead time ("td") typically must be allowed for the transition from one inverter switch state to the next in order to avoid device shoot-through. Because the transition from one voltage level to another is delayed by the dead time only when current commutates from a reverse diode to an IGBT but occurs instantly during the transition from a transistor conducting to a reverse diode, an asymmetry is created which produces a common mode voltage even when the zero common mode states are commanded as shown in FIG. 15. Unless this let-through of common mode voltage during switch commutation is overcome, the value of a zero common mode approach is questionable because, although there may be a reduction in the average voltage to ground stresses applied to the load, significant common mode filtering is required, and the cost, size and weight advantages of the zero common mode approach are lost, even for higher power systems.

The effects of dead time can be compensated by delaying the commutation depending on the sensed polarity of the output current. Table 3 shows how the T1/T2 values are delayed in order to eliminate the production of common mode voltage during switch commutations.

TABLE 3

| dV/dt | Sign (I) | T1 | T2 |
|---|---|---|---|
| − | + | T1 + td | T2 − 2 * td |
| − | − | T1 | T2 |
| + | + | T1 | T2 |
| + | − | T1 + td | T2 − 2 * td |

Figure 16:
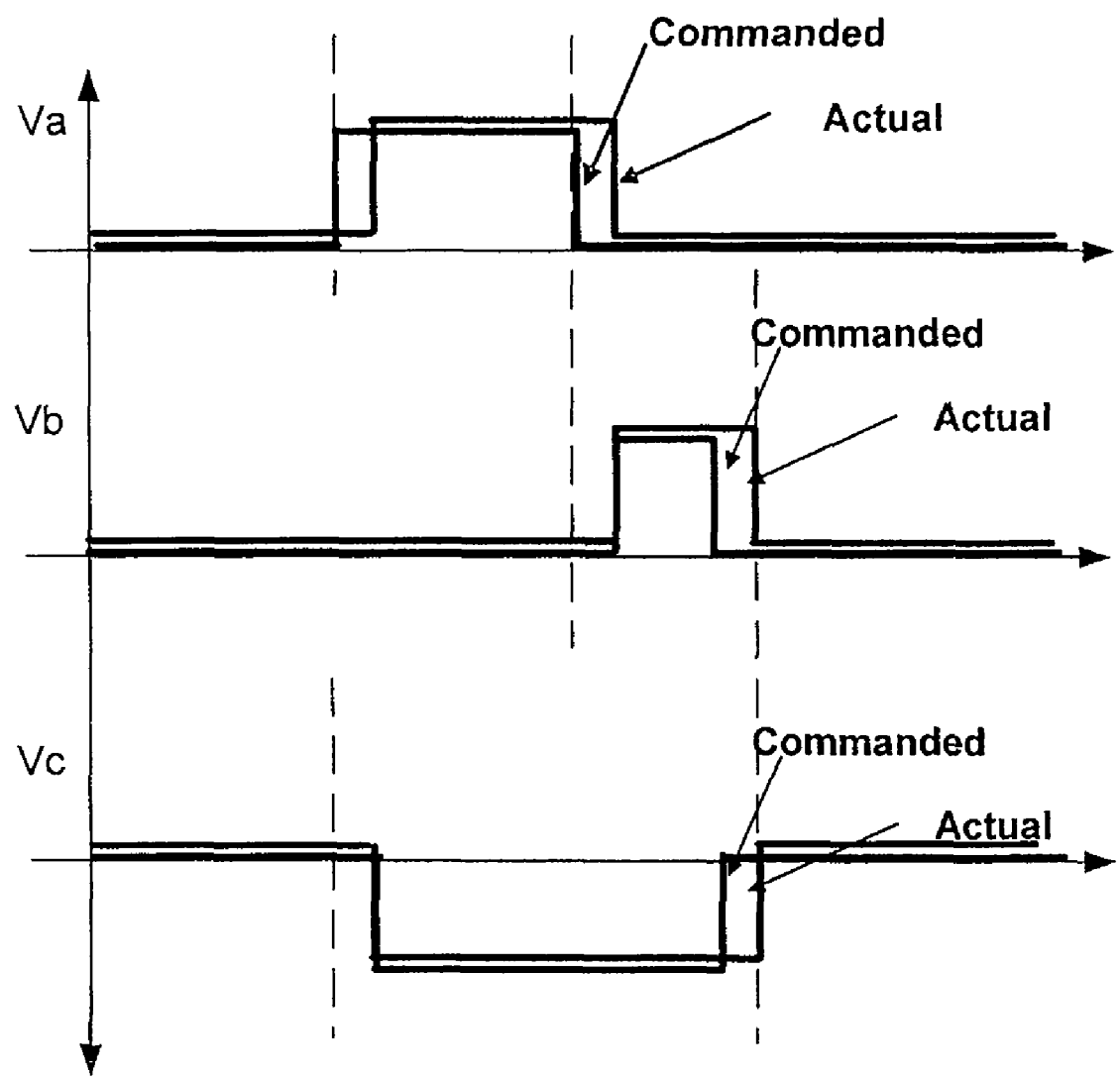
FIG. 16 shows commanded voltages with dead time compensation versus actual output pole voltages for Ib>0, Ib<0, and Ic>0.

The compensated gate commands are shown super-imposed on the actual pole voltages in FIG. 16. The dashed lines show transitions for the uncompensated commands.

IV. Addition of a Fourth Pole

The inverter 400 beneficially balances the voltage across the upper and lower DC link buses DC+ and DC−. This is typically accomplished by utilizing the redundant inner switch states in FIG. 3. For ZCM modulation only the outer switch states are utilized so there are no redundant switch states available.

Figure 17A:
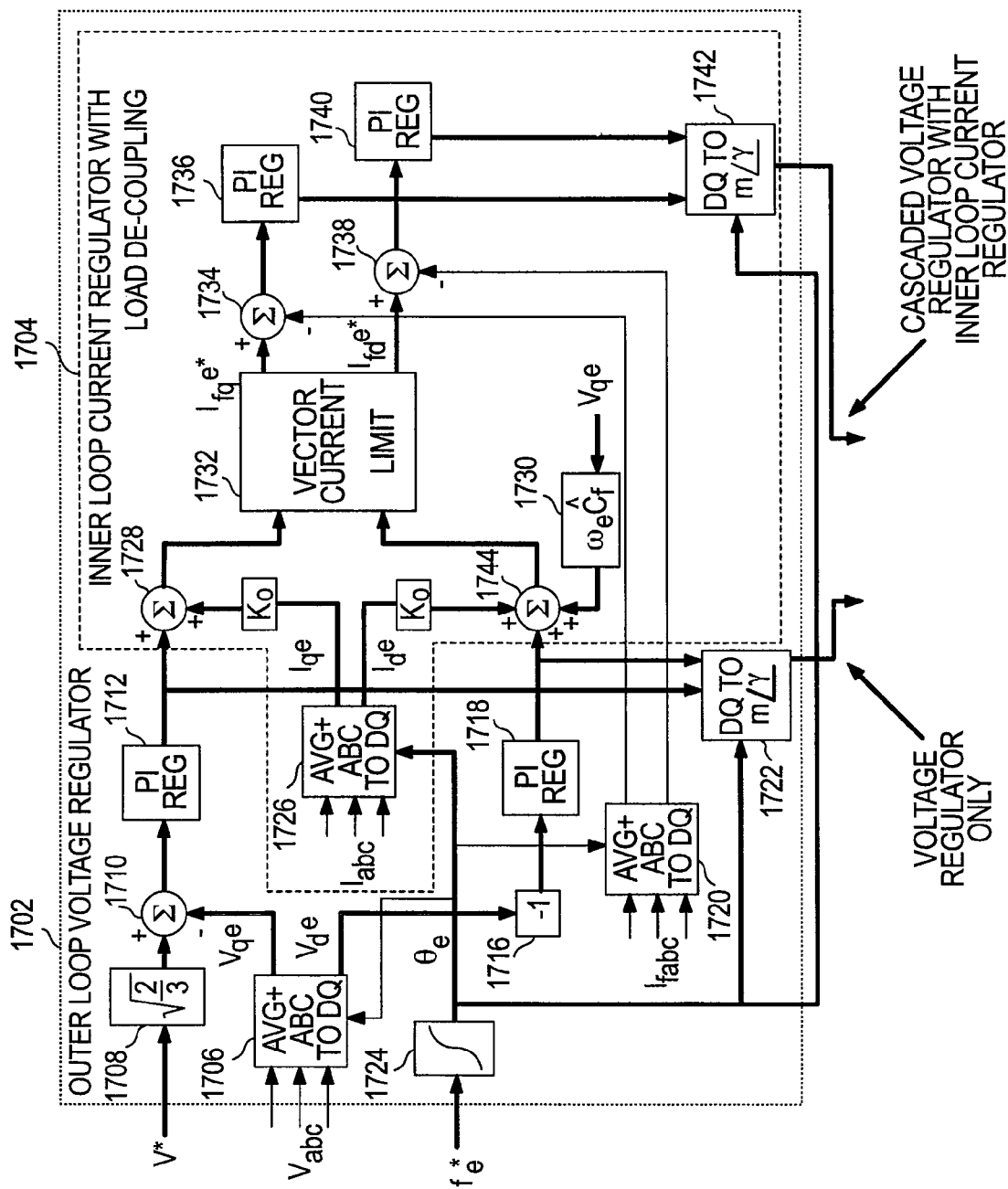
FIGS. 17A and 17B are block diagrams that show the inverter control system.
Figure 17B:
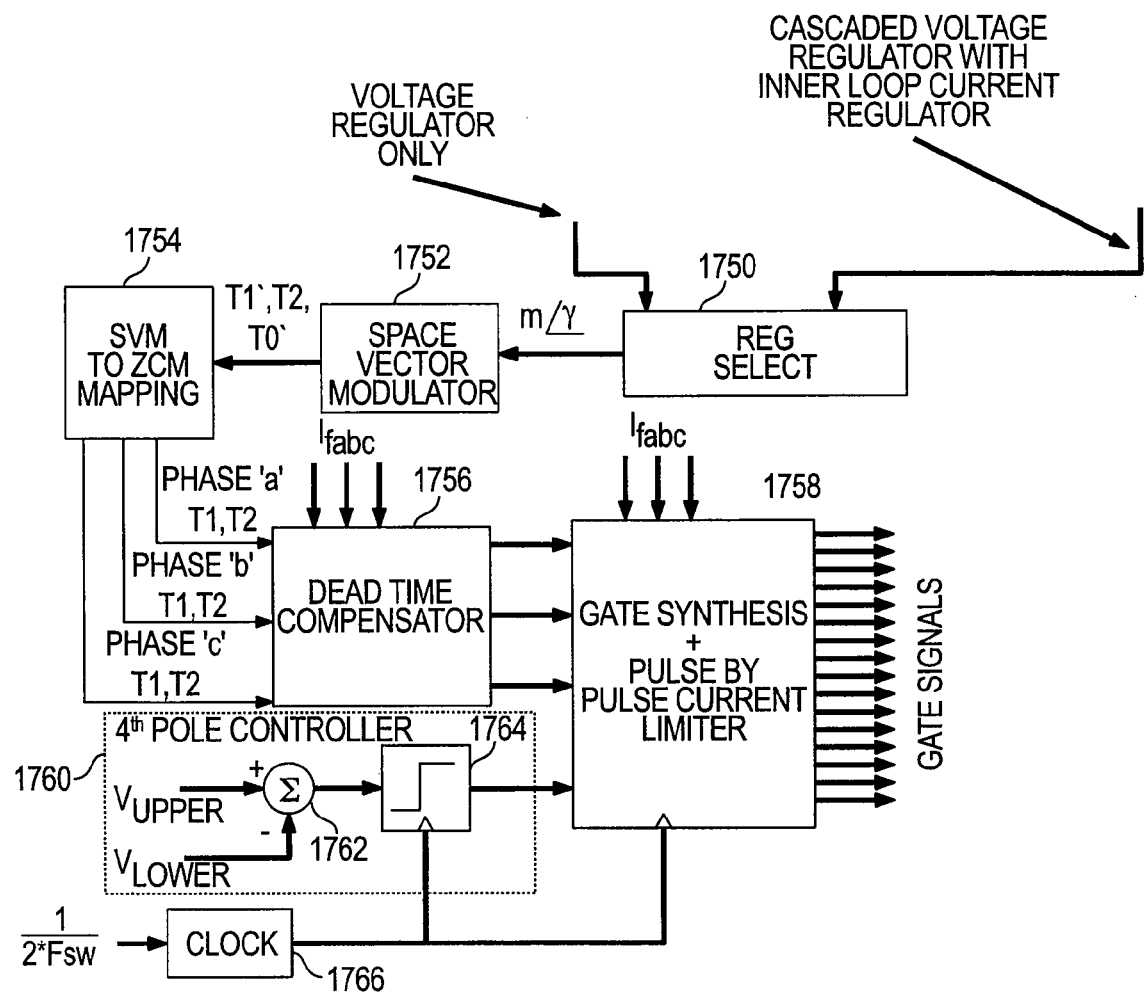

In order to address the issue of DC link balancing, the inverter 400 includes the additional fourth pole X, with its output tied back to the DC link mid-point through inductor Lx. The fourth pole X may be implemented, for example, with either a two-level inverter pole or an NPC inverter pole as shown in the illustrative example, depending on the need to control voltage stress on the devices. The fourth pole X control is accomplished by measuring the difference between the upper and lower DC link voltages and commanding either both upper devices or both lower devices to turn on depending on whether charge must be pulled out of the upper DC link or out of the lower DC link to maintain the balance. One way to accomplish this is through a delta modulator, such as the one shown in FIG. 17B, which commands either upper devices or lower devices to be on depending on the voltage error at each switching frequency period. The control implementation of FIGS. 17A and 17B is described in more detail below.

Figure 18:
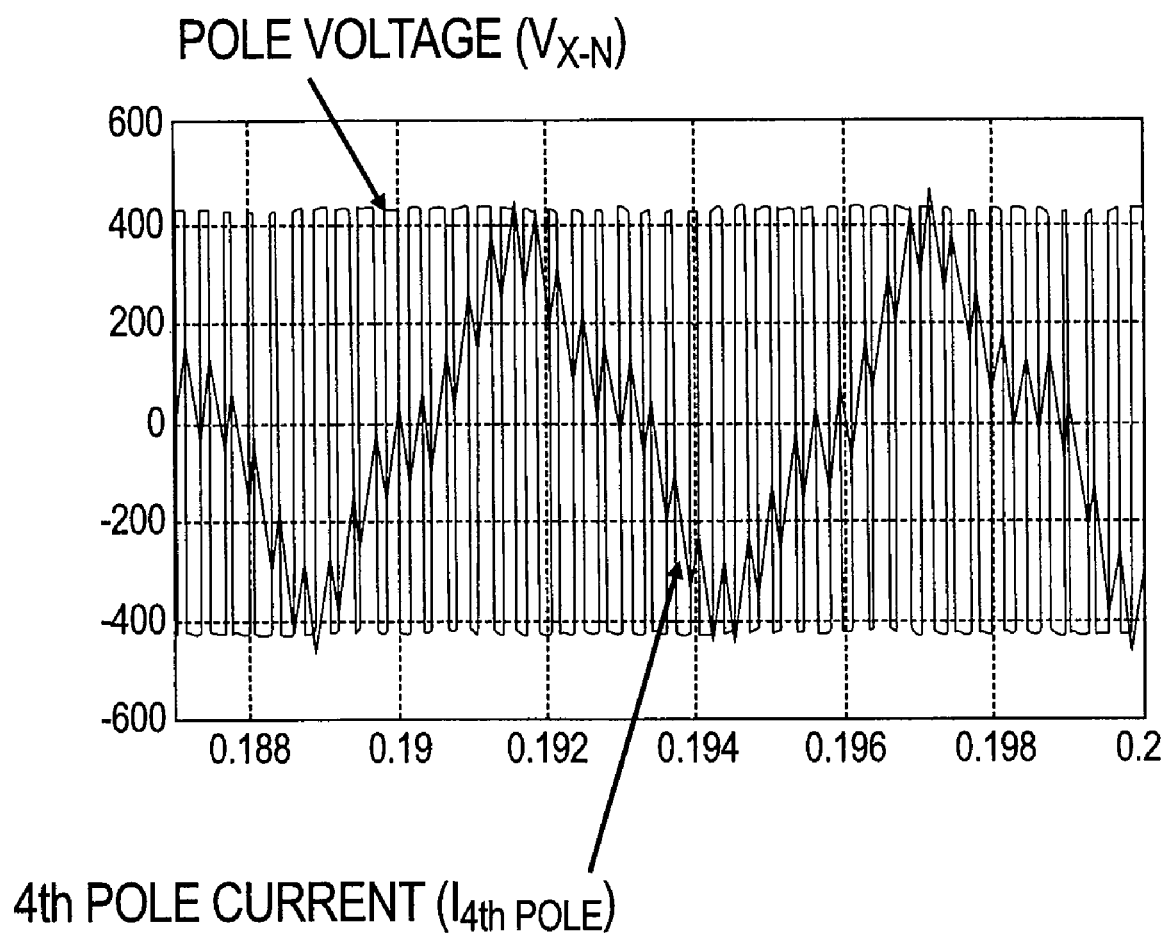
FIG. 18 shows fourth pole voltage and current signals.

FIG. 18 shows the simulated fourth pole voltage (referenced to neutral) and the fourth pole current. Neutral balancing is achieved by using the current, I_4th, in the fourth pole inductor Lx of FIG. 4 to drive the error between the upper and lower voltages to zero. The current has a 3rd harmonic of the fundamental component along with a switching frequency component, as shown in FIG. 18.

The fourth pole also enables a degree of freedom in the utilization of all of the NPC inverter states, beyond constraining the use to only those states which produce common mode voltage. For example, with the fourth pole, the inverter may actively drive the common mode voltage in the system to zero using all of the switch states without any penalty in the differential mode voltage. This approach may be enhanced if there is some common mode filtering and if the inverter is connected to line with other parts of the system that produce common mode voltage and current through resonances or additional active switching from series connected converters that do not have common mode voltage mitigation.

V. Control Implementation

An illustrative control block diagram for the inverter 400 shown in FIGS. 17A and 17B. In the illustrative example, the controller is implemented on a hardware platform that includes an AD 21160 Digital Signal Processor ("DSP") for computational algorithms and a Xilinx XC2V3000 FPGA for logical operations and gate synthesis. Control blocks that are implemented by the FPGA are indicated by dashed-line blocks. The other blocks shown in the illustrative example are implemented by the DSP. The software in the illustrative example is programmed so that two kinds of control may be used.

Figure 27:
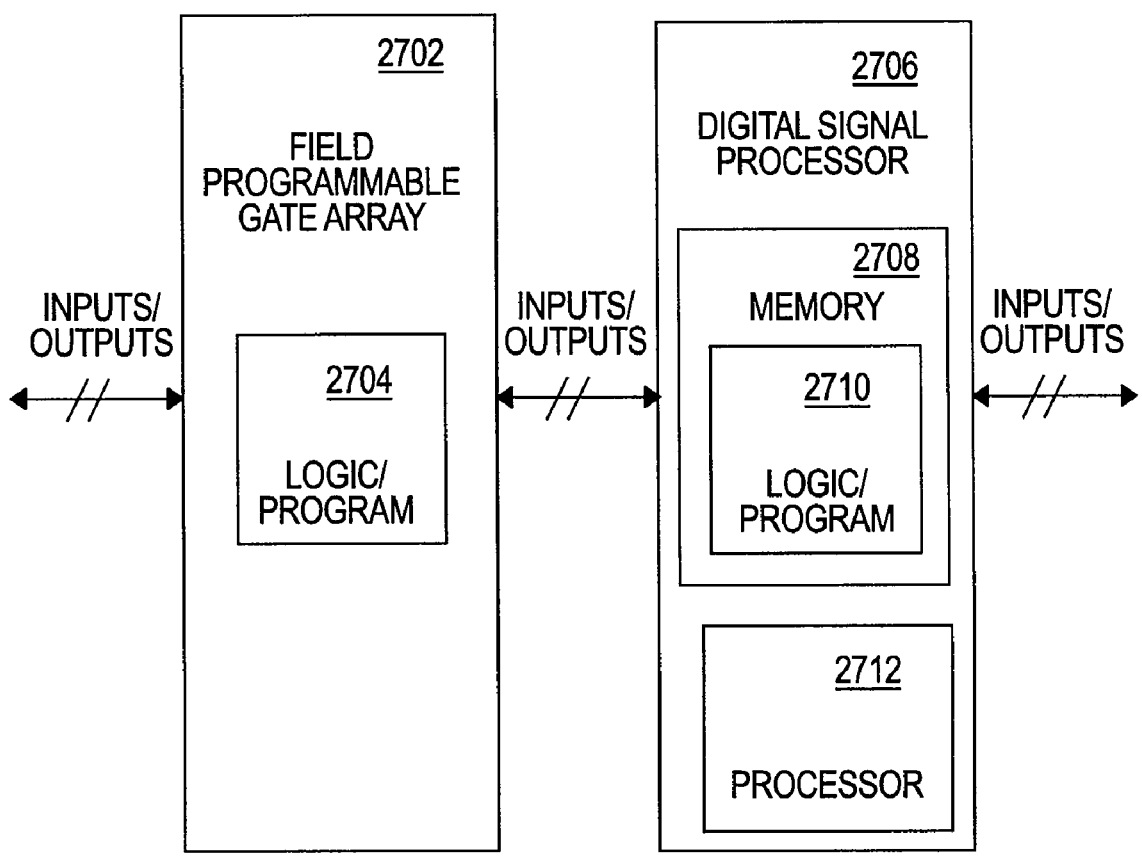
FIG. 27 is a block diagram of illustrative FPGA and DSP components.

FIG. 27 is a block diagram that shows the illustrative FPGA 2702 and DSP 2706 in more detail. The FPGA 2702 includes a logic/program 2706. The DSP 2706 includes a memory 2708 having a program 2710 that includes process steps for implementing the logic described herein. The program 2710 is executed by a processor 2712.

The first type of control is a cascaded outer loop voltage regulator 1702. The second type of control is the cascaded outer loop voltage regulator 1702 with an inner loop current regulator 1704. The inner loop control regulator 1704 functionality is identified by the dashed-line block in FIG. 17A.

Both of these regulators 1702 and 1704 are implemented in the synchronous frame. That is the three phase voltages Vabc and currents Iabc are transformed, at transformers 1706, 1720, and 1728, from stationary 'abc' frames to 'dq' frames that are synchronous with the instantaneous electrical angle θe derived from the commanded frequency fe*, which has been integrated at block 1724. The q-axis voltage $V_q^e$ corresponds to the peak output phase voltage of the inverter 400. The q-axis and d-axis current commands to the inner loop current regulator 1704 correspond to the real and reactive currents, respectively, that are delivered to the load in order to satisfy the outer loop voltage regulator. The q-axis current regulator reference is formed by summing the root of the command voltage V* from block 1708 with q-axis voltage $V_q^e$ at block 1710, which is then PI regulated at block 1712. The d-axis current regulator reference is formed by multiplying the d-axis voltage $V_d^e$ by −1 at block 1716 and then feeding this result into PI regulator 1718.

The inner loop current regulator 1704 includes load decoupling, which has the measured load currents $I_q^e$ and $I_d^e$ in the dq reference frame multiplied by a gain Ko (close to unity) and added at block 1728 and block 1744, respectively, to the current regulator references. These are required to improve the voltage transient response of the cascaded regulator. The current values leave blocks 1728 and 1744, respectively and enter vector current limit block 1732, the outputs $I_{fq}^{e+}$ and $I_{fd}^{e+}$ of which are summed (at blocks 1734 and 1738 respectively) with currents Iabc and then passed through PI regulators 1736 and 1740, respectively.

In the illustrative example, the voltage and current feedbacks used in the controller are sampled and averaged 8 times over one 100 μs interval. This greatly improves the differential mode output harmonic performance of the inverter. The PI regulated voltages from blocks 1712 and 17188 are used to construct 'm' and 'γ' at block 1722. The PI regulated currents from blocks 1736 and 1740 are used to construct 'm' and 'γ' at block 1742.

A regulator select block 1750 in FIG. 17B shows how the two types of regulators are selected. If the "voltage regulator only" mode is selected, then the outputs from which 'm' and 'γ' are constructed come from the PI Regulator blocks 1712 and 1718 of the outer loop voltage controller. If the "cascaded voltage regulator with inner loop current regulator" is selected, then the outputs of the inner loop current regulators 1736 and 1740 form 'm' and 'γ'.

The output of the regulator select block 1750 passes through a space vector modulator block 1752 and then is mapped to ZCM in block 1754 as discussed above. The ZCM modulated output from block 1754 enters a dead time compensator 1756, where dead time is compensated as discussed above.

FIG. 17B also shows the $4^{th}$ pole controller 1760. As described above, the fourth pole X control is accomplished by measuring the difference, at block 1762, between the upper and lower DC link voltages and commanding either both upper devices or both lower devices to turn on depending on whether charge must be pulled out of the upper DC link or out of the lower DC link to maintain the balance. One way to accomplish this is through a delta modulator 1758, which commands either upper devices or lower devices to be on depending on the voltage error at each switching frequency period. The switching frequency period is obtained from clock 1766.

VI. Experimental Results

Figure 19:
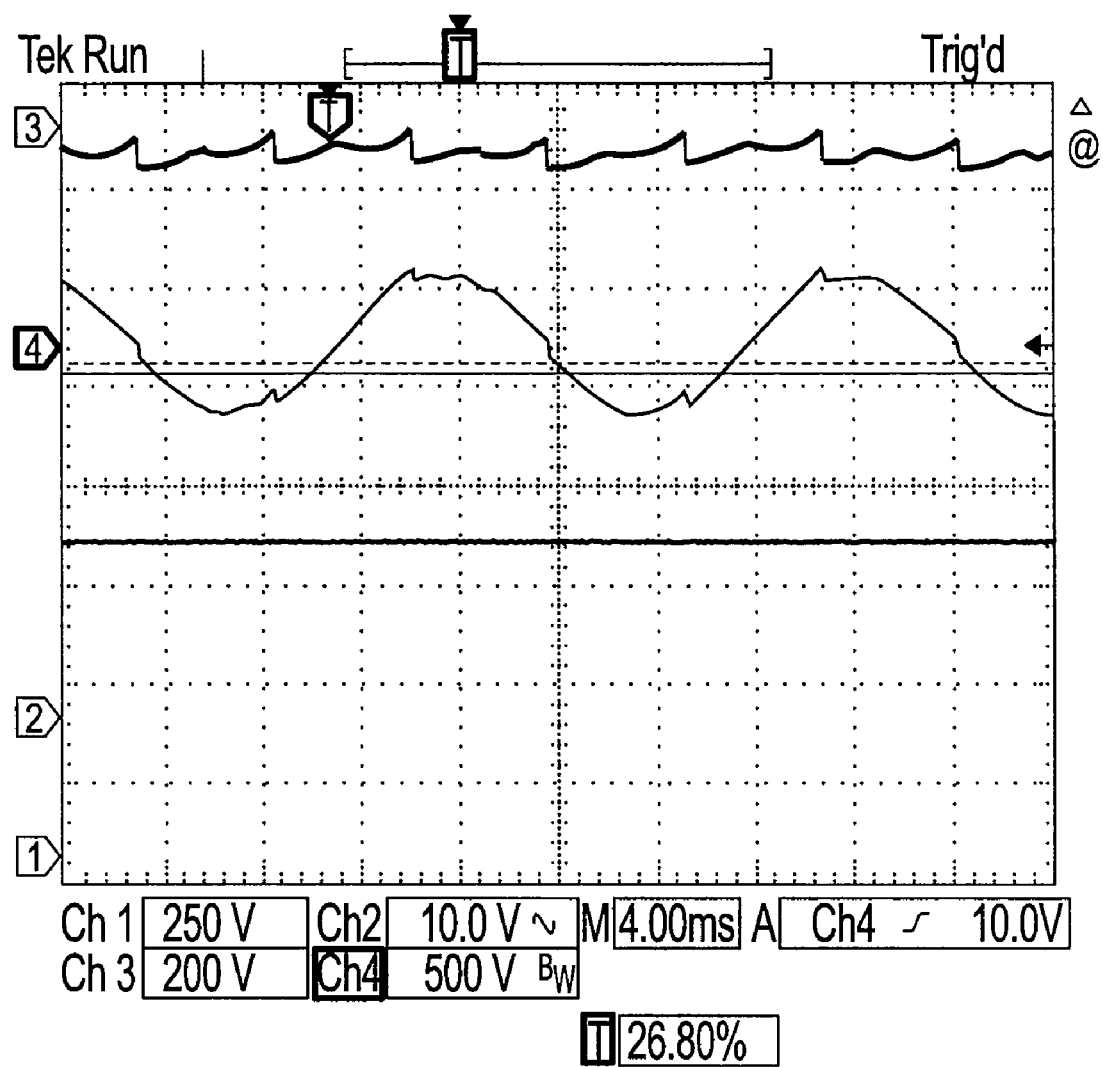
FIG. 19 shows voltage and current signals during experimentation.

The inventors conducted a series of experiments during the development of the inverter 400. The hardware includes two parallel multi-use H-Bridge power electronic modules which implement the illustrative inverter of FIG. 4. The input to this system was a 12-pulse transformer rectifier. Experimental results are at a 78 kW output power condition, limited only by the available power source. FIG. 19 shows the input DC line to ground voltage from the DC source (trace 1 at bottom), the input DC line to line voltage (trace 2 second from bottom), the output voltage measured from one output phase to the neutral point (i.e., mid-point of the DC link)(trace 3 at top), and the fourth pole current (trace 4 second from top). As depicted in FIG. 19, the voltage to ground and differential voltage ripple of the input source do not significantly affect the output results and that the fourth pole current is as predicted in FIG. 18.

Figure 20:
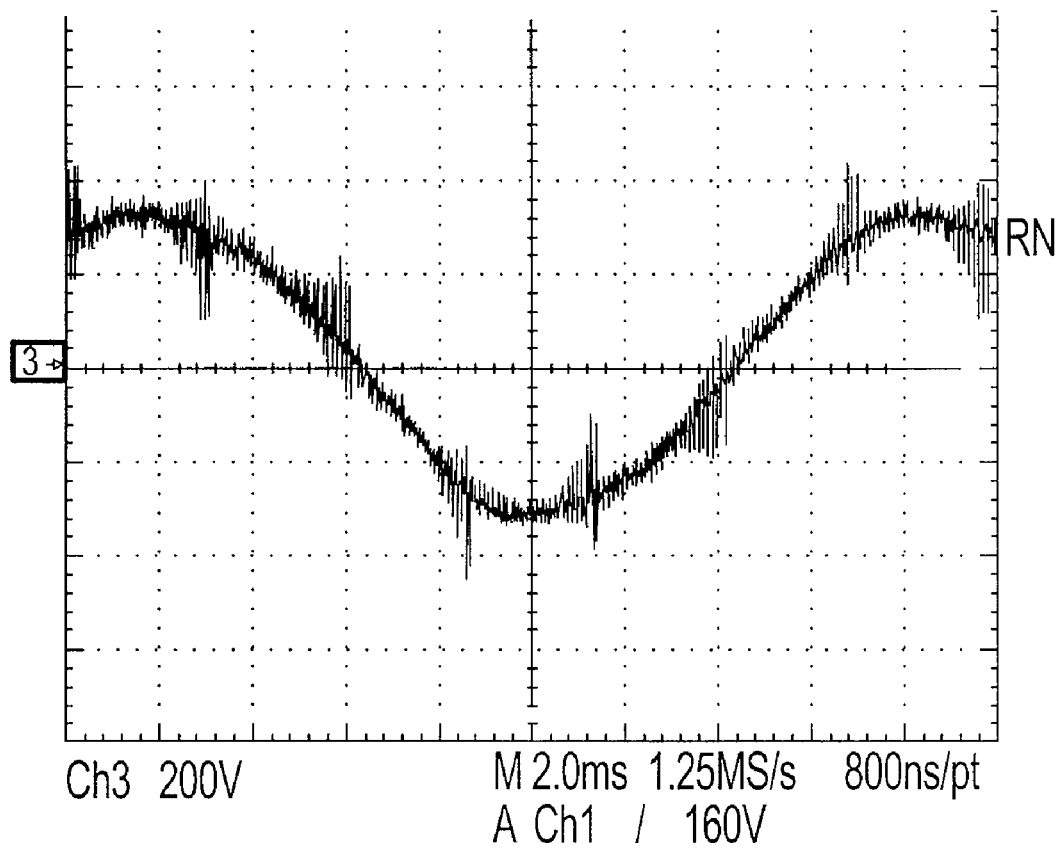
FIG. 20 shows voltage from line to neutral of the NPC inverter with ZCM modulation and no dead time compensation.

FIG. 20 shows the voltage measured from one output phase to the neutral (VLN) with ZCM modulation and no dead time compensation. For the experimental set-up, this enabled the evaluation of the zero common mode voltage effectiveness. Although, from a system perspective, the voltage to ground is important, a voltage to ground measurement would not as effectively measure this effect because the impact of stray capacitance to ground in the experimental set-up would need to be sorted out. Because the experimental system includes a 2nd order differential mode output filter having a bandwidth of about 600 Hz, the differential mode voltage is essentially sinusoidal (the switching frequency is 2.5 kHz). Any switching frequency components in VLN in FIG. 20 are then produced by the common mode voltage. Disturbances to the otherwise sinusoidal voltage occur at each commutation interval where dead time introduces an asymmetry.

Figure 21:
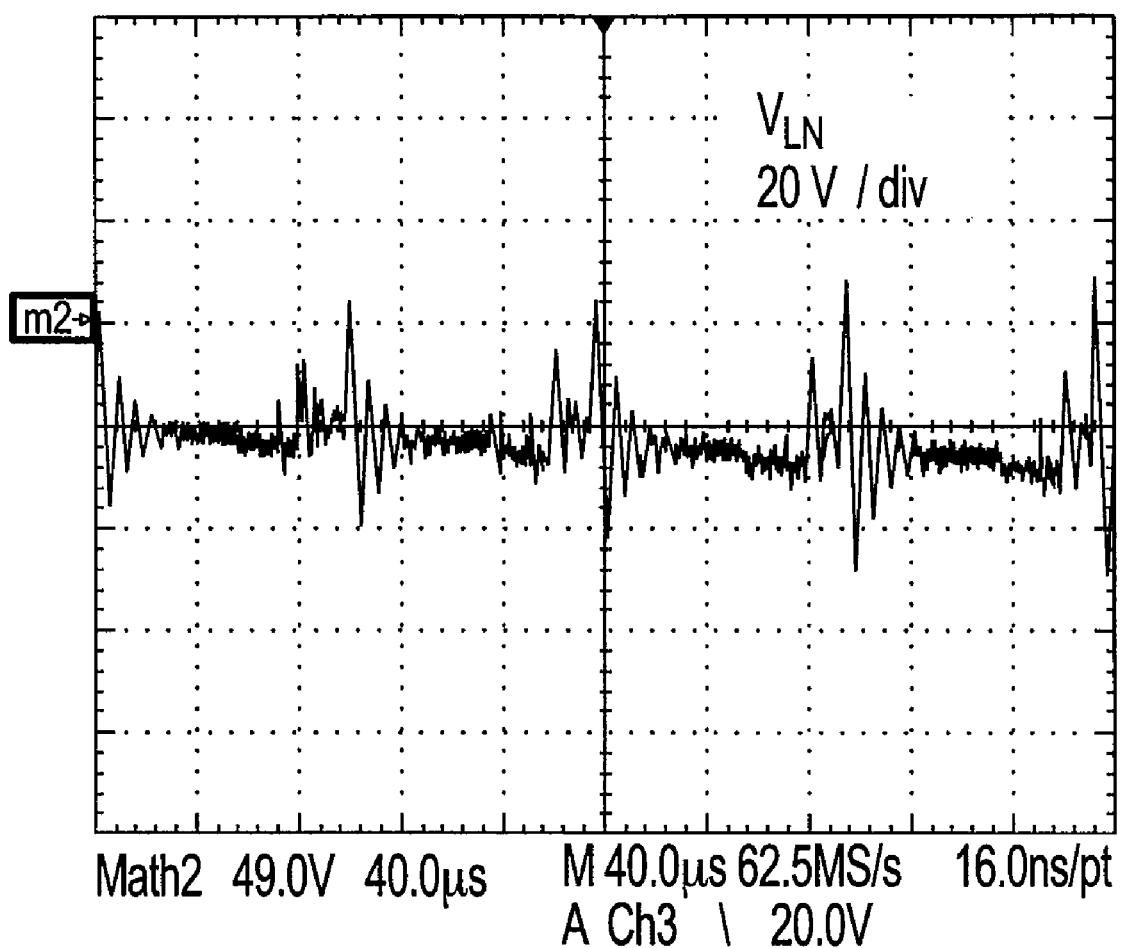
FIG. 21 shows voltage from line to neutral of the NPC inverter with ZCM modulation and no dead time compensation.
Figure 22:
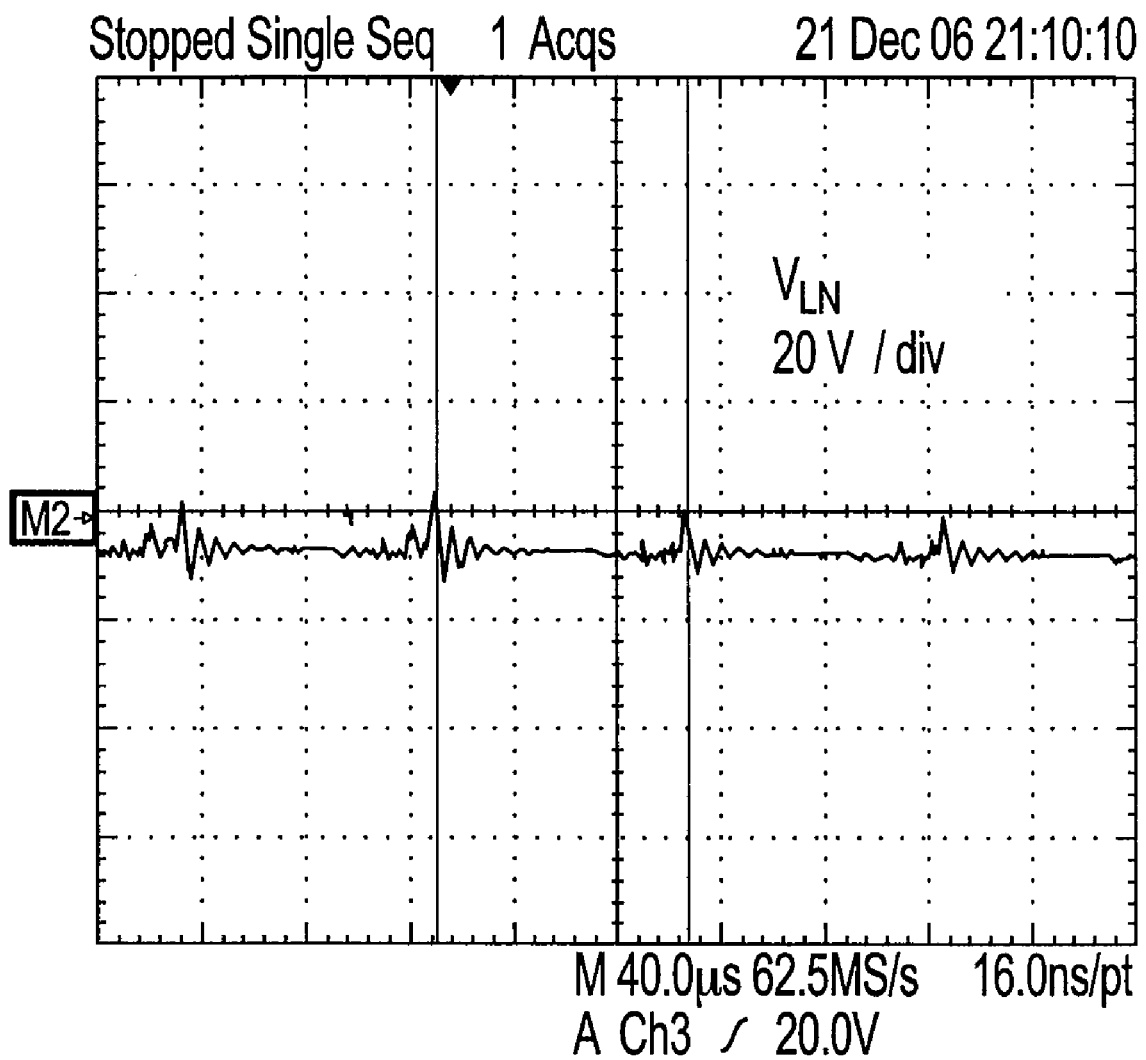
FIG. 22 shows voltage from line to neutral of the NPC inverter with ZCM modulation and dead time compensation.

FIG. 21 shows the common mode voltage of FIG. 20 zoomed in, which has the dead time compensation disabled. FIG. 22 shows the same with the dead time compensation enabled. A comparison between these two plots demonstrates that the remaining common mode voltage is indeed a result of the blanking time between switch states. Their effect, and the amplitude of resulting high frequency content during the switch state change, is reduced significantly—by nearly a factor three—through the introduction of dead time compensation. However, the common mode voltage is not completely eliminated due to the overlap of voltage that occurs during the commutation sequences of the three phase output voltages.

The remainder of the experimental results focuses on optimizing the differential mode performance of the experimental system. The experimental system produces three-phase, 450V, 60 Hz output with a DC input voltage of 800V. This input voltage is higher than is necessary with a normal NTV controlled NPC inverter or even a 2-level inverter because the ZCM modulator only has 86.6% voltage utilization. Still, the experimental results demonstrate that adequate differential mode performance can be achieved. The output controller beneficially effectively utilizes the available voltage.

Figure 23:
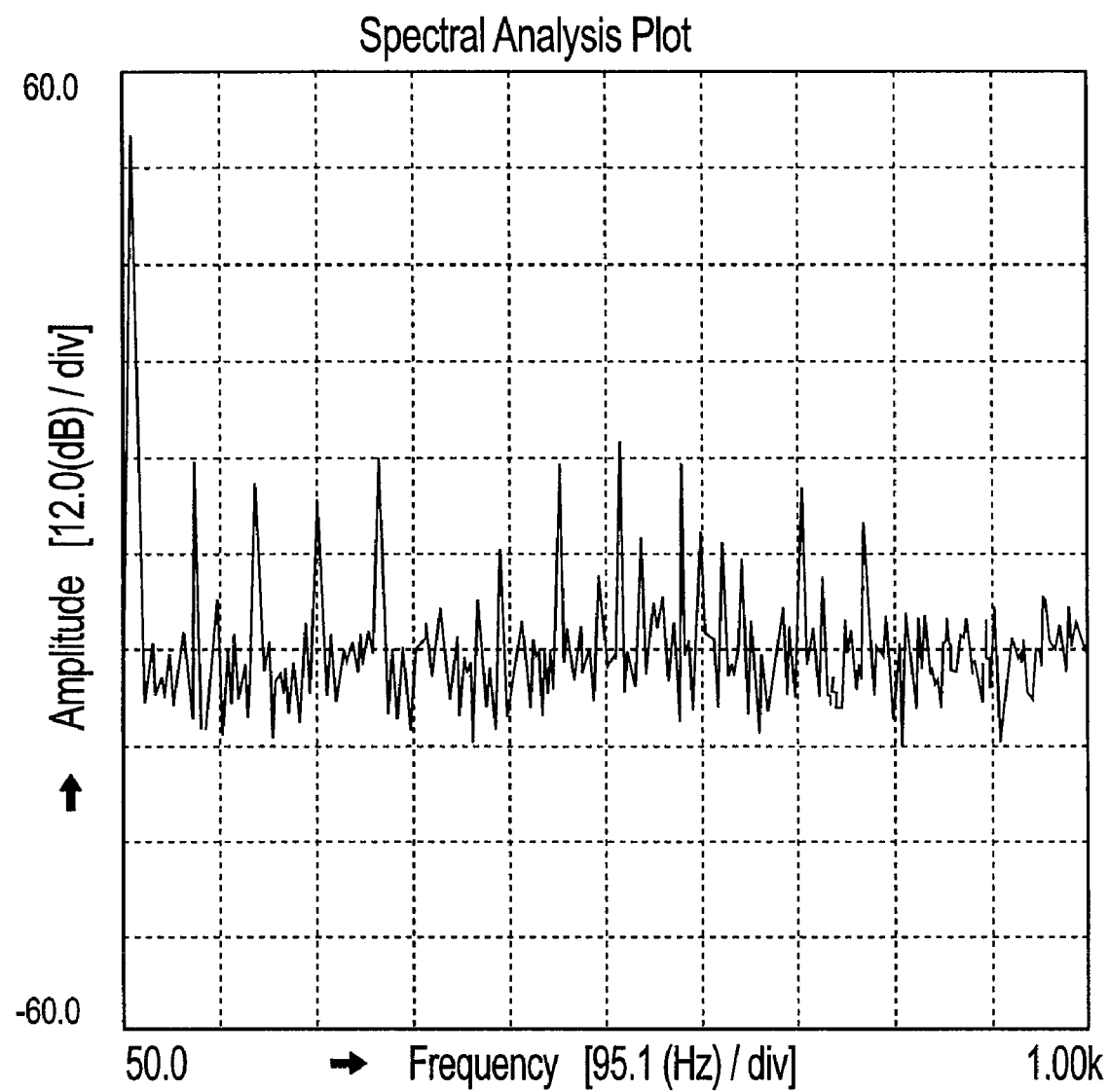
FIG. 23 shows the line to line voltage spectrum when the outer loop voltage regulator and inner loop current regulator are selected.

FIG. 23 shows the voltage spectrum of the output line to line voltage (VLL) with the "cascaded voltage regulator with inner loop current regulator". The power quality objective for the experimental applications being considered for this converter is that the maximum IHD would be 40 dB down from the fundamental and that the THD is less than 3%. This objective was achieved. The most troublesome harmonics are the 3rd, 5th and 7th, as was expected and can be eliminated if the DC link voltage is increased.

Figure 24:
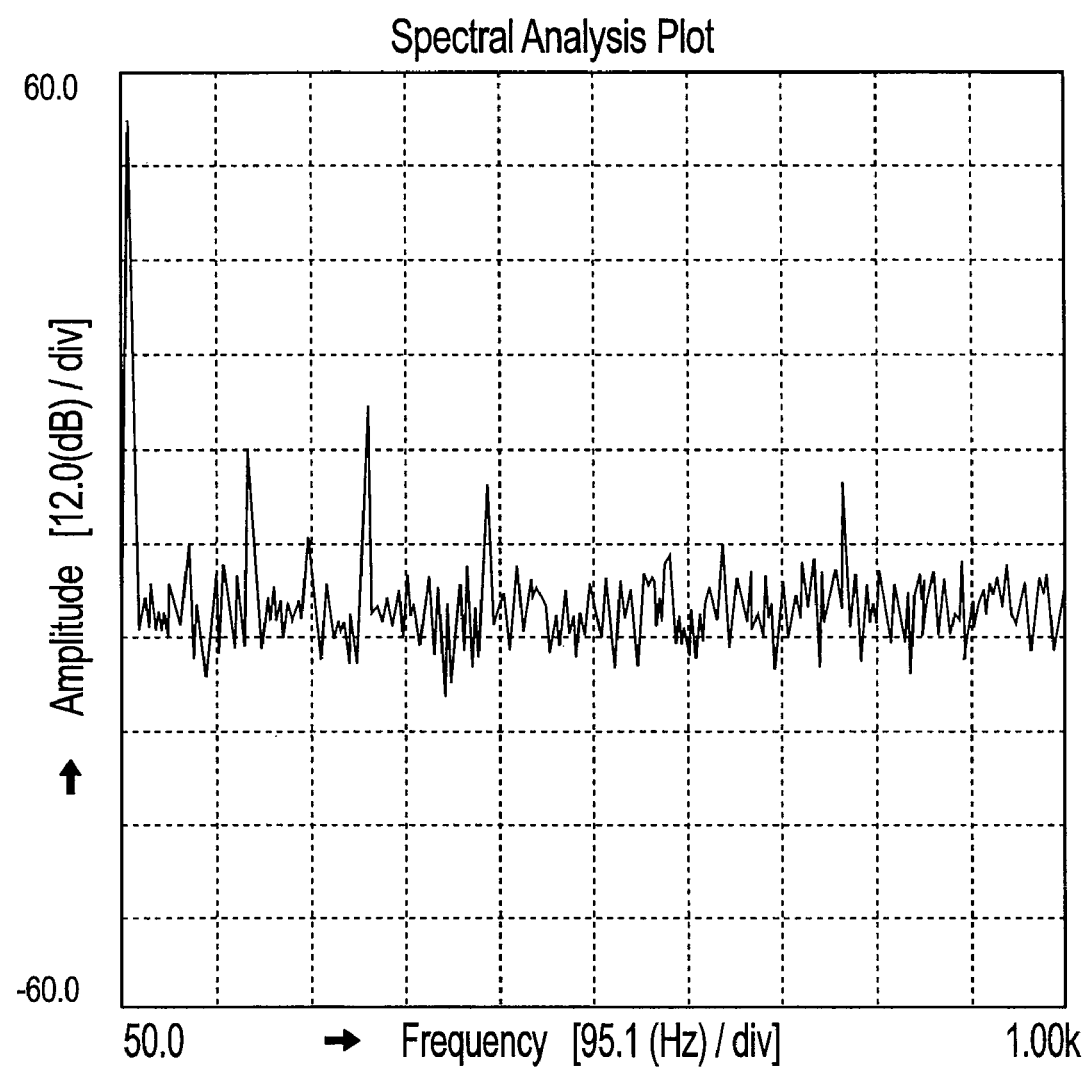
FIG. 24 shows the line to line voltage spectrum when the outer loop voltage regulator is selected.

FIG. 24 shows the output voltage spectrum if "voltage regulator only" is selected. Note that the harmonic content is reduced. This demonstrates that the dynamic voltage margin required with cascaded regulators must be higher, so a control implementation with only an outer voltage loop is preferable when combined with the ZCM modulator. The need to handle transient output fault currents can be handled in another way, such as by pulse by pulse current limiting and the like.

Figure 25:
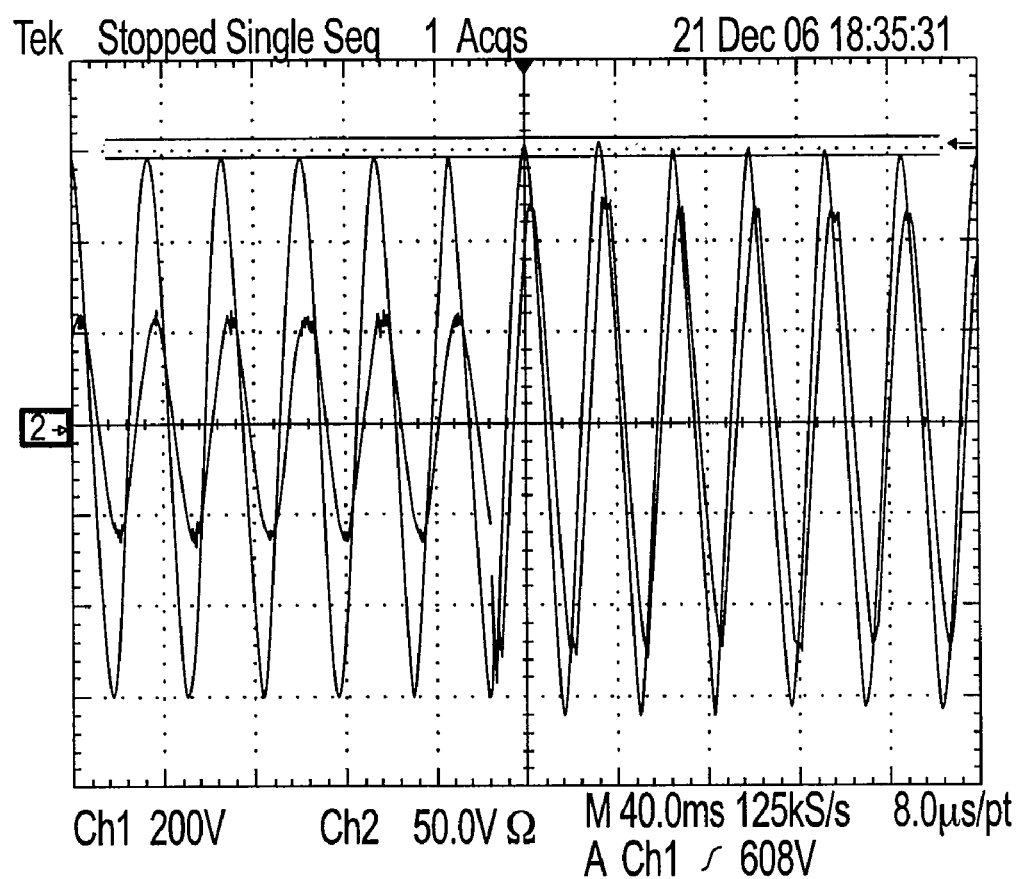
FIG. 25 shows the output voltage (VLL) and current (IL) during load application transient.
Figure 26:
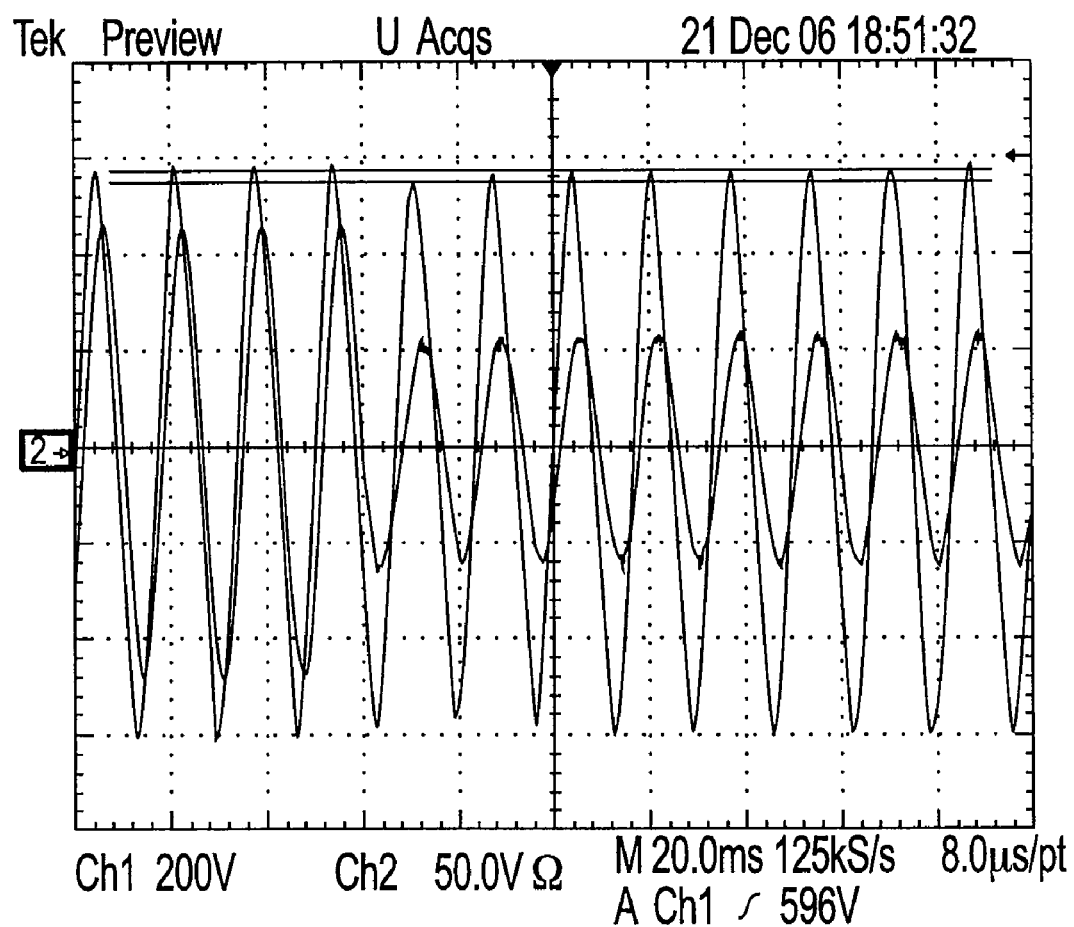
FIG. 26 shows the output voltage (VLL) and current (IL) during load application transient.

FIGS. 25 and 26 show the output voltage and current of the experimental system during step load application and removal with the control configured as "voltage regulator only". The transient response is very good and the penalty here for zero common mode voltage production is not significant.

Therefore, methods and systems consistent with the present invention provide a three-phase NPC inverter that produces low common mode voltage. Nearly sinusoidal voltage is produced from each line to a common point without the need for an additional EMI filter. With the addition of dead-time compensation, the only significant component of common mode voltage associated with power semiconductor switching is due to the switch (e.g., IGBT) rise and fall rates.

The inverter 400 is compatible with a variety of applications, such as for example, DC Micro-Grid systems, shipboard, electrical distribution systems where the inverter is the source of power and should not be a significant contributor to system EMI, and the like. This approach also significantly reduces the voltage to ground stresses that would otherwise be applied to the loads in these systems without the need EMI filtering, which can be a significant cost, size and weight for systems of the power levels being considered. Furthermore, methods and systems consistent with the present invention demonstrate good steady state harmonic and transient performance, even with the inherent drawbacks in voltage utilization introduced by ZCM modulation.

Figure 28:
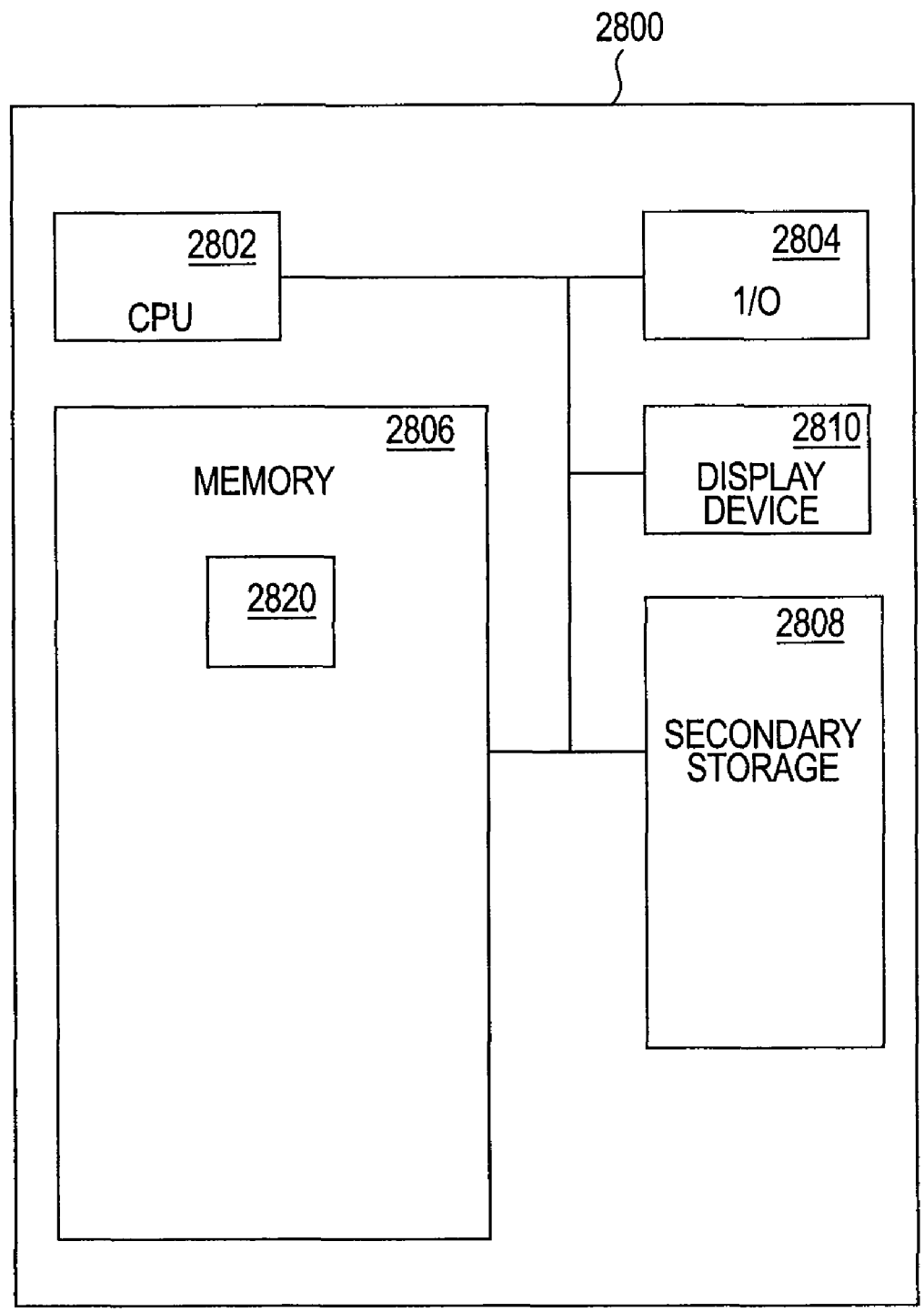
FIG. 28 is a block diagram of a control data processing system.

In the illustrative embodiment, the control is implemented in an FPGA 2702 and a digital signal processor 2706. The control may alternatively be implemented in another computational device, such as a computer-based system. FIG. 28 is a block diagram that depicts an illustrative computer-based system 2800 that may interface with inverter to control the inverter 400. The illustrative computer 2800 comprises a central processing unit (CPU) 2802, an input output I/O unit 2804, a memory 2806, a secondary storage device 2808, and a video display 2810. The computer may further comprise standard input devices such as a keyboard, a mouse or a speech processing means (not illustrated). The computer memory 2806 includes a program 2820 that includes processing steps that perform the control functionality described above with reference to the FPGA and digital signal processor.

Although aspects of one implementation are depicted as being stored in memory, one skilled in the art will appreciate that all or part of control logic implemented by the systems and methods consistent with the present invention may be stored on or read from other computer-readable media, such as secondary storage devices, like hard disks, floppy disks, and CD-ROM; or other forms of ROM or RAM either currently known or later developed. Further, although specific components of data processing system have been described, one skilled in the art will appreciate that a data processing system suitable for use with methods, systems, and articles of manufacture consistent with the present invention may contain additional or different components.

VII. NPC Rectifier Illustrative Example

Methods and systems consistent with the present invention may be implemented in a variety of applications. An illustrative inverter 400 is described above. Methods and systems consistent with the present invention may also be applied, for example, to a four pole neutral-point clamped three phase rectifier with low common mode voltage. Such a rectifier may be used in a variety of applications, such as interfacing with a ship service bus, such as the MIL-STD-1399 ship service bus. This alternative illustrative example is described below.

The demand for power electronic converters in U.S. naval shipboard applications is rapidly increasing. Some of these applications include variable frequency speed drives for pump, fan, elevator and lift loads; frequency changers for aircraft power; degaussing power supplies; auxiliary DC power systems; weapons systems; and primary and secondary propulsion. As the propulsion electric drive is typically the largest load on the power system, it directly connects to the medium voltage power on ships and may receive relief from some specifications. The other power converters listed above interface to the three phase 450V AC ship service bus. Currently, there are two governing electrical specifications that relate to this interface:

MIL-STD-1399—In this standard, the currents drawn by the loads from the 45VAC bus cannot have individual harmonic distortion exceeding 3%, with a total harmonic distortion of less than 5%. Further, to maintain the ability to operate with a line to ground fault, the load should not provide paths to ground. This is formalized in a leakage current specification that limits the allowable impedance to ground.

MIL-STD-461 CE101—In this standard, the conducted EMI generated by the loads measured at the 450VAC terminals has to be below prescribed levels starting at 1 kHz. The first portion of this specification which covers the range from 1 kHz to 10 kHz is typically met when the individual harmonic distortion of the currents is maintained below 3%. The portion of the specification from 10 kHz to 150 kHz has a great impact on the converter architectures.

As described above, the conventional approach for controlling EMI is through the use of passive EMI filters. These EMI filters consist of sequential stages of inductive and capacitive elements that attenuate the conducted currents by shunting them to earth ground through the capacitive elements. As commercial EMI specifications apply above 150 kHz, small capacitive shunt elements suffice, as their impedance is low enough at 150 kHz. However, for proper attenuation all the way to 10 kHz, for example, lower shunt impedances are needed corresponding to larger capacitance values. The floating bus (or minimum impedance) requirement from MIL-STD 1399 limits the allowable impedance to 0.1 μF. This design problem due to the combined impact of these electrical specifications has produced conventional systems that are sub-optimal.

Figure 29:
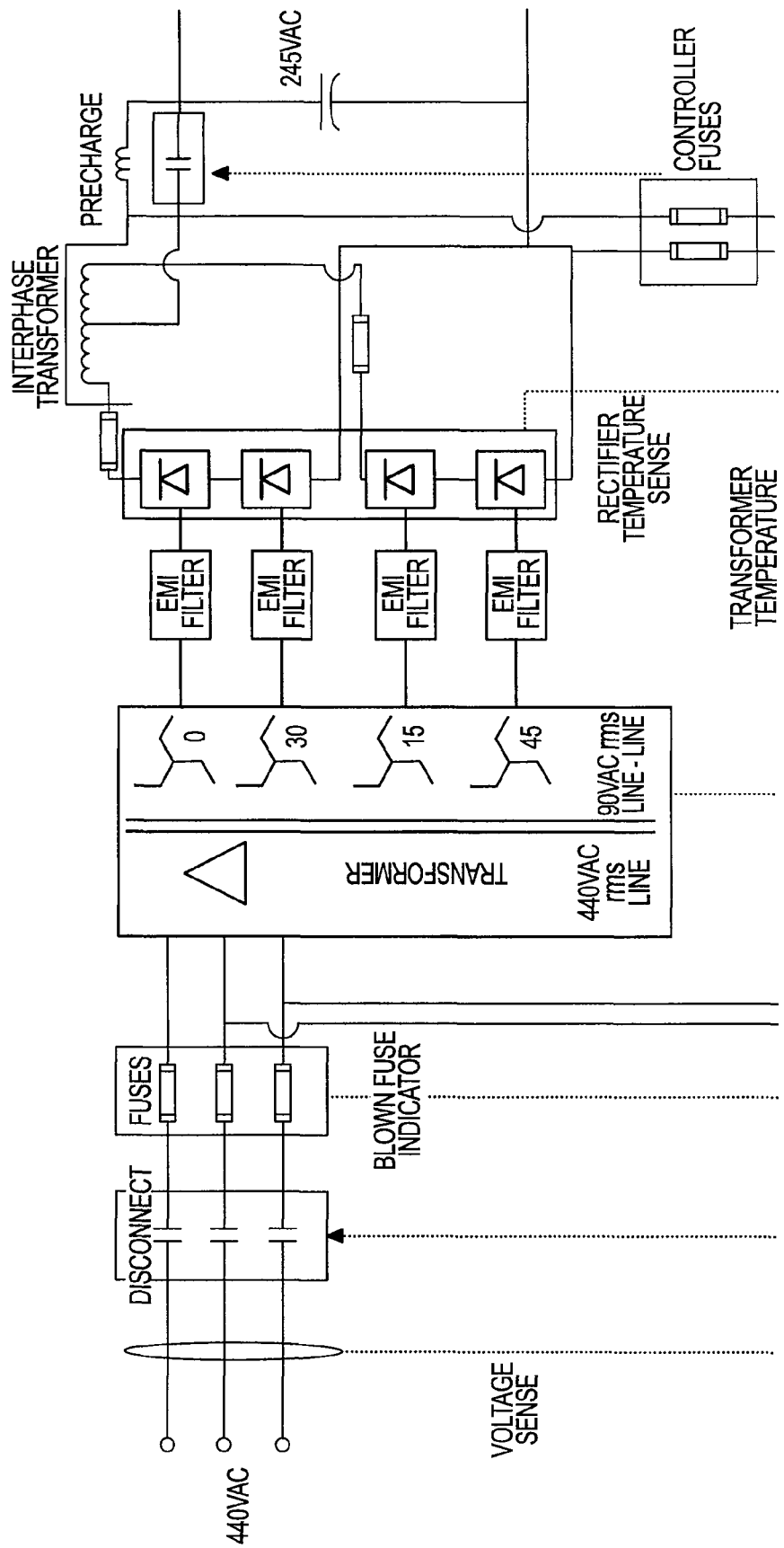
FIG. 29 is a block diagram of a 24 pulse transformer rectifier unit for interfacing to ship service.

VII-1. Conventional Approaches to Connect to Ship Service AC Bus There are two primary conventional approaches used for interfacing power electronic loads to the 1399 ship service bus while meeting the above-described specifications. These conventional approaches are summarized below:

Transformer rectifier units—A multi-pulse transformer rectifier (24 or 36 pulse) is used to connect to the ship service bus. The secondary of the transformer contains multiple windings that are phase shifted from each other and feed separate three phase diode bridges. The diode bridges are connected together onto a common DC bus through inter-phase transformers (IPTs). This solution tends to be heavy and bulky as it contains a 60 Hz transformer and cannot be used with regenerative loads such as elevators or cranes. This is a conventional solution that is deployed on navy ships for variable frequency converters. A 24-pulse example is shown in FIG. 29.

Figure 30:
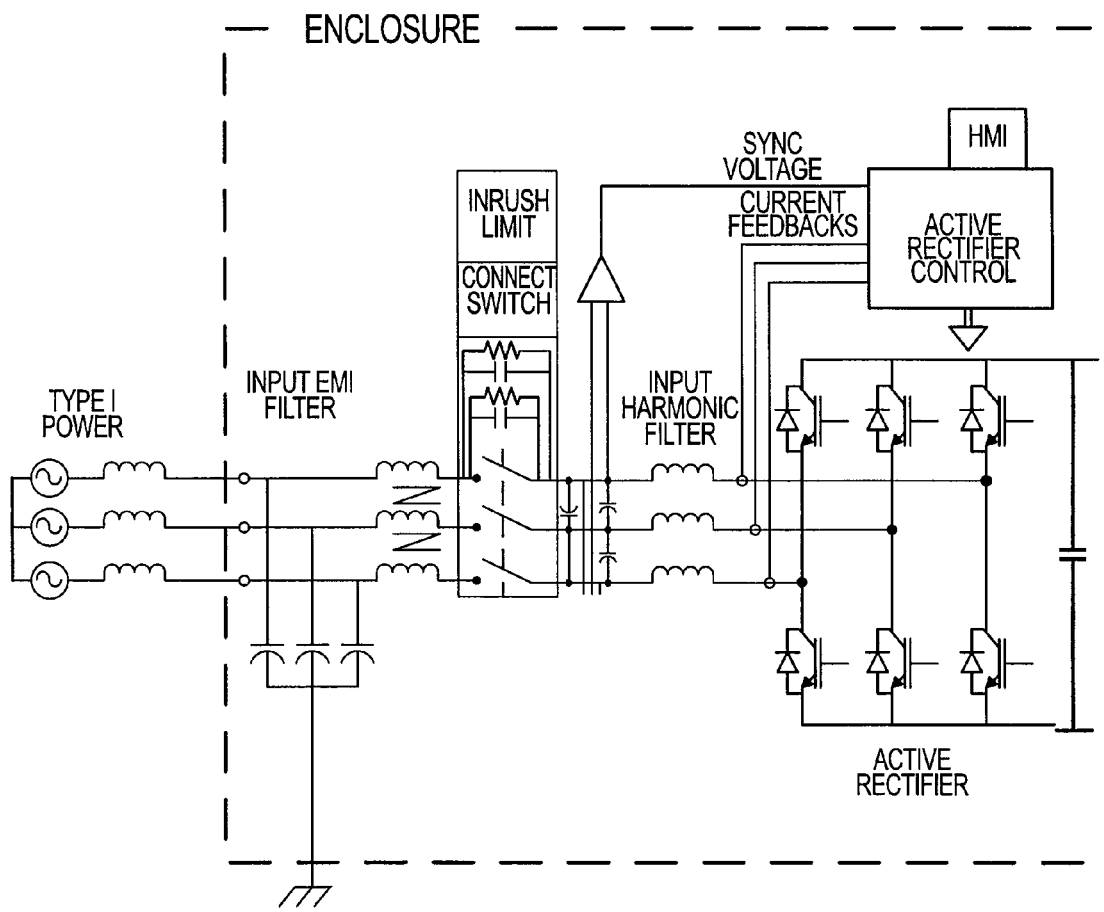
FIG. 30 is a block diagram of a conventional two-level rectifier interfacing to ship service.

Active rectifier based solutions—A three phase two level variable frequency drive can be connected to the ship service bus. The drive can be operated as an active rectifier with sinusoidal currents on the input (meeting 1399). The DC bus voltage of the drive can be controlled and fed to the next power conversion stage. This arrangement requires differential LCL filters for shunting the high frequency switching currents away from the ship service bus. This also requires an EMI filter connected between the ship service bus and the input to the drive. The EMI filter inductance is large as the cutoff frequency has to be low to meet the 10 kHz requirement of MIL-STD-461, but the capacitance has to be limited to 0.1 μF per MIL-STD-1399. The is a conventional approach that is slowly being introduced on navy ships. A representative system with an active rectifier driving a variable speed drive controlling a motor load is shown in FIG. 30.

The shortcomings of these conventional approaches have impeded the use of power electronic converters in many shipboard applications and cruder solutions with poorer control and efficiency are used. For example, fire pumps on ships use line start induction motors that operate continuously pumping water overboard. A variable speed drive is a perfect fit but becomes challenging due to the issues of interfacing its DC bus to the ship service 1399 bus. The transformer solution is unacceptable due to size and weight restrictions for this front end. The two-level active front end does not have a transformer but instead has very large EMI filters. While the EMI filter inductance is large due to the cross combination of specifications as discussed above, the actual current it has to support is driven by the common mode voltage generated by the active rectifier.

Figure 31:
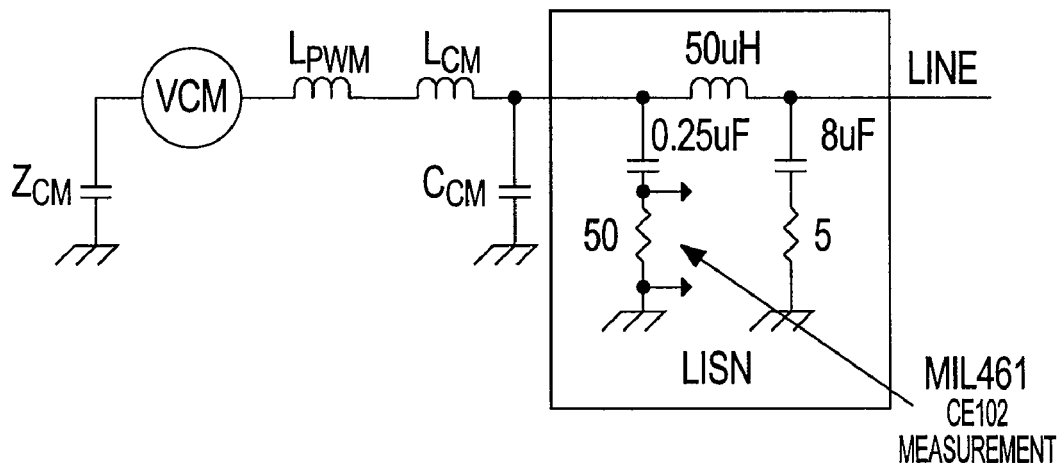
FIG. 31 is a schematic diagram of a simplified common mode circuit for active rectifiers.

Common mode voltage is the average voltage generated by the three switching poles of the active rectifier with respect to a common point (nominally the midpoint of the DC bus). This common mode voltage drives the common mode currents through the pulse width modulation (PWM) and EMI filter elements ($L_{PWM}$, $L_{CM}$, and $C_{CM}$) to the chassis. This current is returned to the DC bus through parasitic capacitances in the switching devices as well as the load modeled 22. as $Z_{CM}$. The MIL-STD-461 CE102 pass/fail measurement is made across the capacitive element of the EMI filter using a line impedance stabilization network (LISN). The PWM and EMI filter, the LISN network and the parasitic capacitances form a voltage divider network between the common mode voltage source and the CE102 measurement as shown in FIG. 31.

Figure 32:
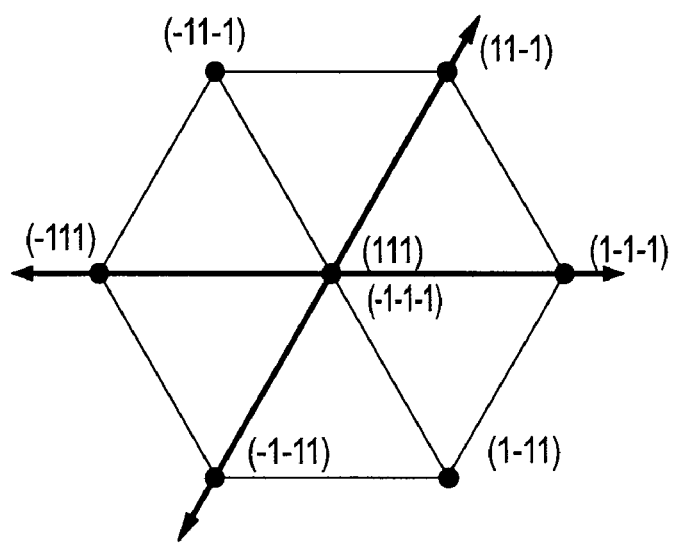
FIG. 32 is a switching state diagram of a two-level converter.

The switching state for a two-level converter is shown in FIG. 32. The common mode voltage generated by two-level active rectifiers is very high as every switching state in a two-level converter leads to non-zero common mode as shown in Table 4.

TABLE 4

| State | CM voltage | CM voltage $V_{DC}$~1pu $V_0$~0 |
|---|---|---|
| −1−1−1 | −($V_{DC}$/2) | −½ |
| −1−11 | −(⅓)($V_{DC}$/2) | −⅙ |
| −11−1 | −(⅓)($V_{DC}$/2) | −⅙ |
| −111 | (⅓)($V_{DC}$/2) | +⅙ |
| 1−1−1 | −(⅓)($V_{DC}$/2) | −⅙ |
| 1−11 | (⅓)($V_{DC}$/2) | +⅙ |
| 11−1 | (⅓)($V_{DC}$/2) | +⅙ |
| 111 | ($V_{DC}$/2) | +½ |

Thus, an effective means to reduce the CE102 measured voltage is through changes to the impedance divider network. Increasing the series impedance by having a large common mode inductance can achieve this goal, however this adversely impacts the size and volume of the system. Another possible solution is to create a shunt path for the common mode currents to flow back to the DC bus, however this increases the current levels in the filter inductances, which also adversely impacts the size.

VII-2. Four Pole Three Level Converter Using a four-pole three level converter, such as the topology described above, reduces the CE102 measurement voltage by eliminating the common mode source voltage. This is achieved by using a standard three phase three level converter that can be modulated to produce zero common mode voltage.

Figure 33:
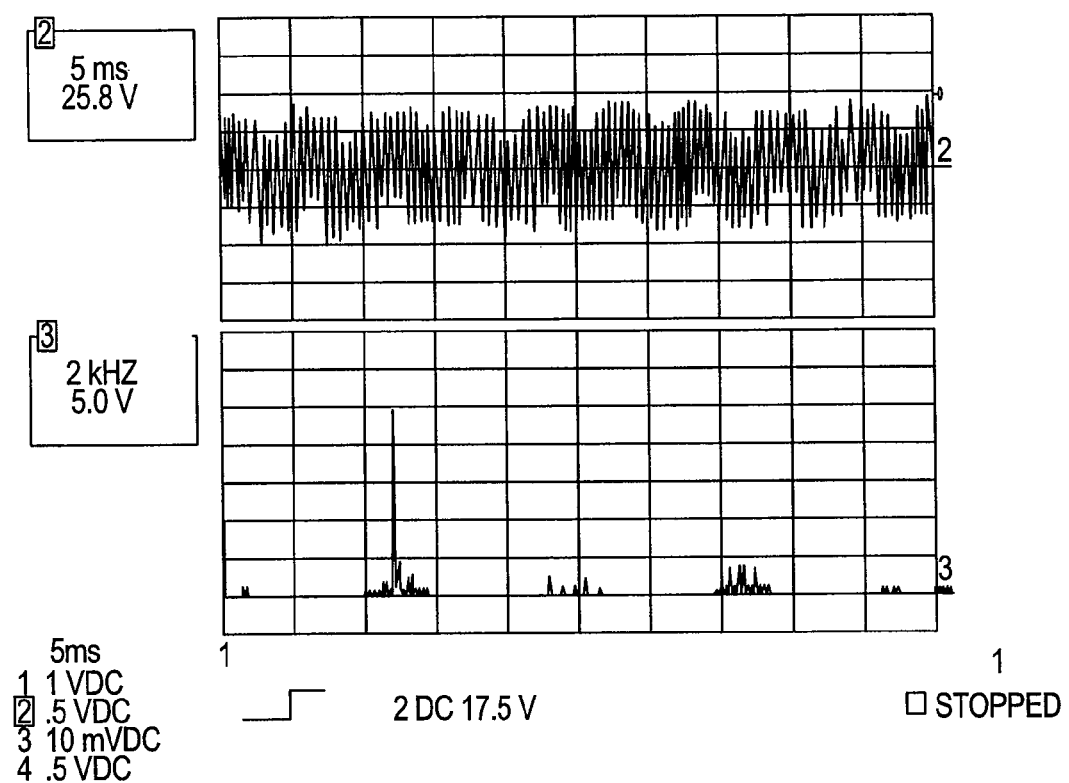
FIG. 33 shows the common mode voltage and its spectrum for NTV modulation.
Figure 34:
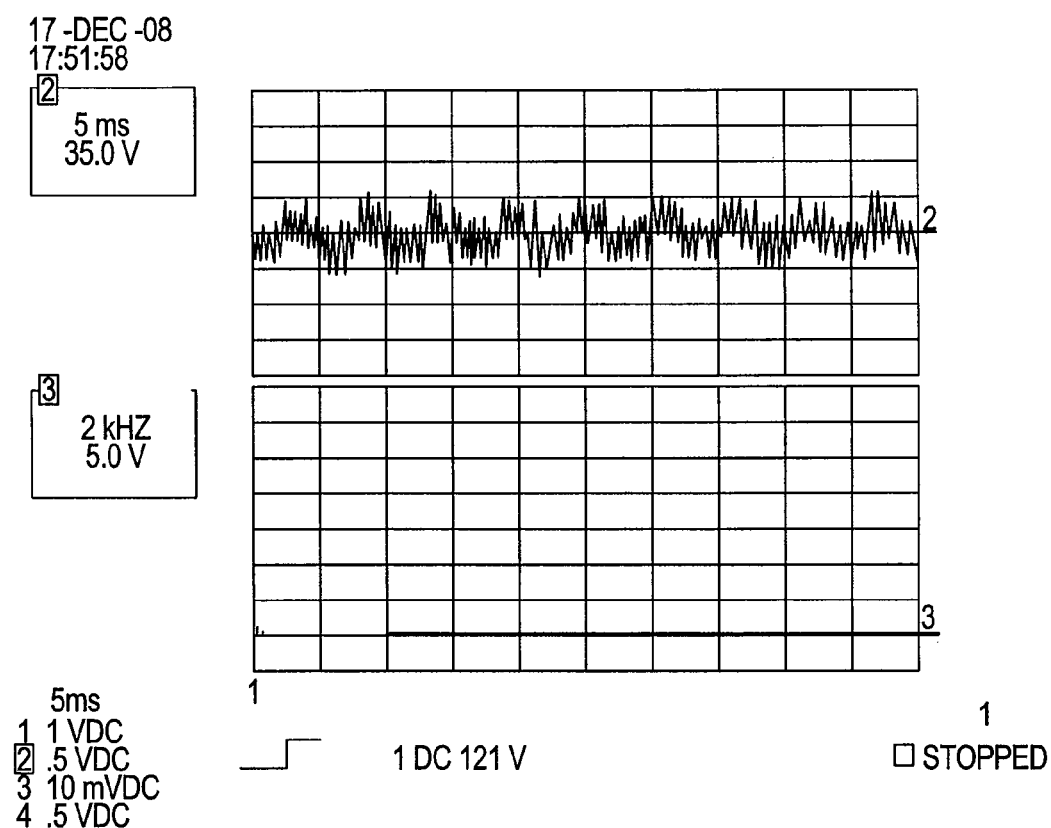
FIG. 34 shows the common mode voltage and its spectrum for ZCM modulation.

The various switching states for a three-level converter are shown in FIG. 3. As described above, if only the seven zero common mode states of FIG. 3 are utilized are excluded from the three-level converter strategy, then no common mode voltage is generated. The peak attainable voltage magnitude is limited to the inscribed circle in the hexagon created by these six zero common mode voltage states as shown in FIG. 3. This comes at a cost, however, because the bus utilization achieved by the ZCM voltage modulator can be geometrically shown to be 86.6% of the full potential utilization of the NPC modulator. The success of this strategy can be seen from FIGS. 33 and 34, which show the measured spectral content of the common mode voltage with a conventional and zero common mode modulator respectively.

Unfortunately, the reduction in common mode voltage is achieved with some penalty. The conventional three-level modulators use redundant state switching to balance the neutral point voltage and control neutral point current. This degree of freedom is unavailable if a strict zero common mode strategy is used which leads to a much higher neutral point current ripple and instability in the neutral point voltage. This can be observed in the measured spectra. The conventional three phase three-level structure contains three poles. Methods and systems consistent with the present invention add a fourth pole to the three phase three level device and it is connected to the neutral point through an inductive impedance. This regains the degree of freedom.

Figure 35:
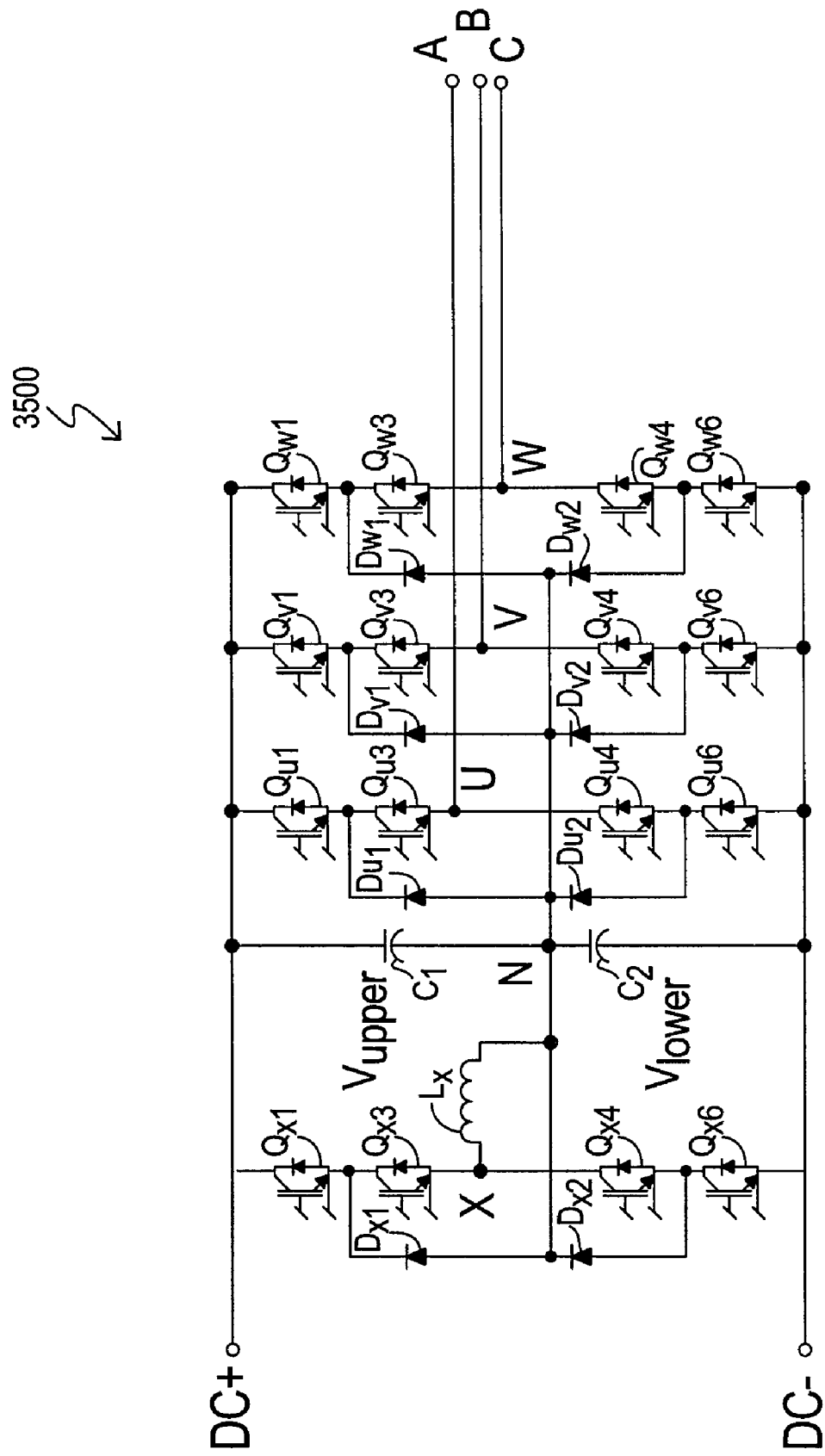
FIG. 35 is a schematic diagram that shows the topology of an NPC rectifier consistent with the present invention.

FIG. 35 shows a topology of an illustrative NPC rectifier 3500 consistent with the present invention. The illustrative rectifier 3500 includes four poles U, V, W, and X, where X is an additional pole that stabilizes the neutral point voltage. The rectifier 3500 converts a three-phase voltage Vabc to a DC output voltage Vdc. A DC bus capacitor $C_1$ is coupled between the DC+pole and neutral in the upper stage. A DC bus capacitor $C_2$ is coupled between the DC-pole and neutral in the lower stage.

Each pole U, V, W, and X of the rectifier 3500 includes a pair of switches Q1 and Q3 in the upper stage and a pair of switches Q4 and Q6 in the lower stage. The switches may be a variety of switch types, such as IGBT, MOSFETs, and the like. In the illustrative example, the switches are IGBTs. Each switch Q includes a diode coupled in parallel with the switch. As shown in the illustrative example, pole U includes switches Qu1 and Qu3 in series in the upper stage, and switches Qu4 and Qu6 in series in the lower stage. Diode Du1 is coupled in parallel between switches Qu1 and Qu3 and neutral. Diode Du2 is coupled in parallel between switches Qu4 and Qu6 and neutral. Regarding pole V, pole V includes switches Qv1 and Qv3 in series in the upper stage, and switches Qv4 and Qv6 in series in the lower stage. Diode Dv1 is coupled in parallel between switches Qv1 and Qv3 and neutral. Diode Dv2 is coupled in parallel between switches Qv4 and Qv6 and neutral. Regarding pole W, pole W includes switches Qw1 and Qw3 in series in the upper stage, and switches Qw4 and Qw6 in series in the lower stage. Diode Dw1 is coupled in parallel between switches Qw1 and Qw3 and neutral. Diode Dw2 is coupled in parallel between switches Qw4 and Qw6 and neutral. Regarding pole X, pole X includes switches Qx1 and Qx3 in series in the upper stage, and switches Qx4 and Qx6 in series in the lower stage. Diode Dx1 is coupled in parallel between switches Qx1 and Qx3 and neutral. Diode Dx2 is coupled in parallel between switches Qx4 and Qx6 and neutral. Pole X further includes an inductor Lx coupled in parallel between switches Qx3 and Qx4 and neutral.

Figure 36:
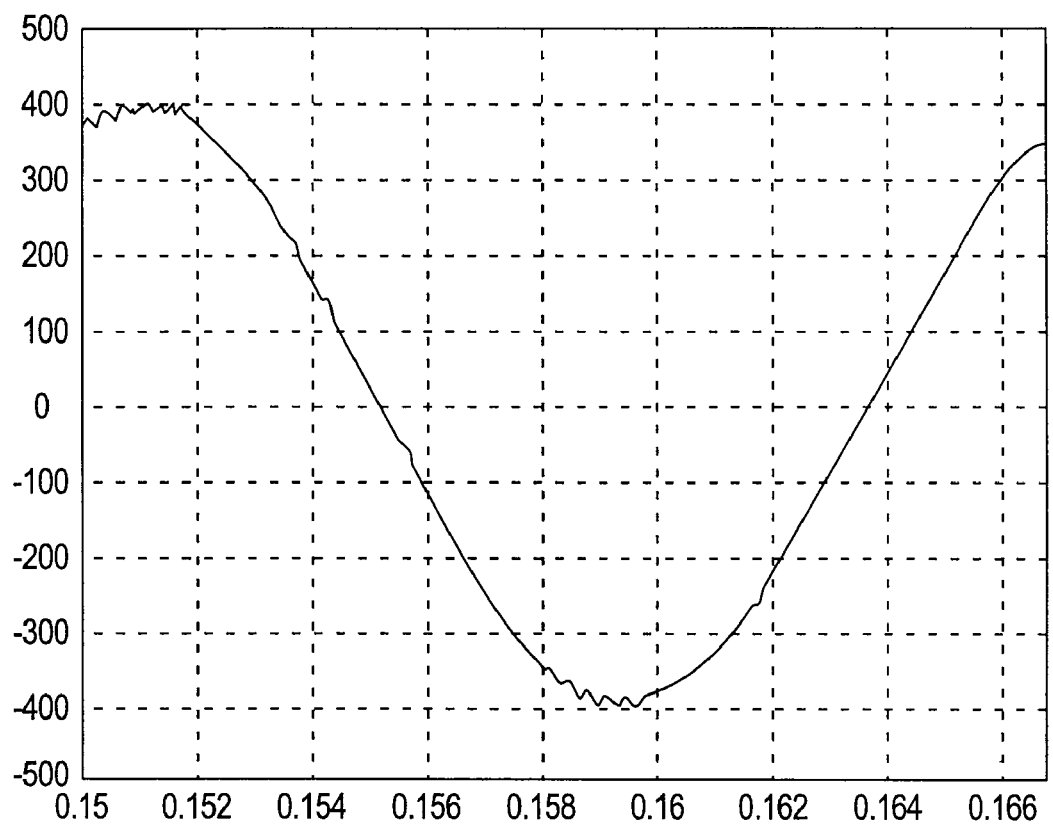
FIG. 36 shows the line current waveform of a two-level rectifier.
Figure 37:
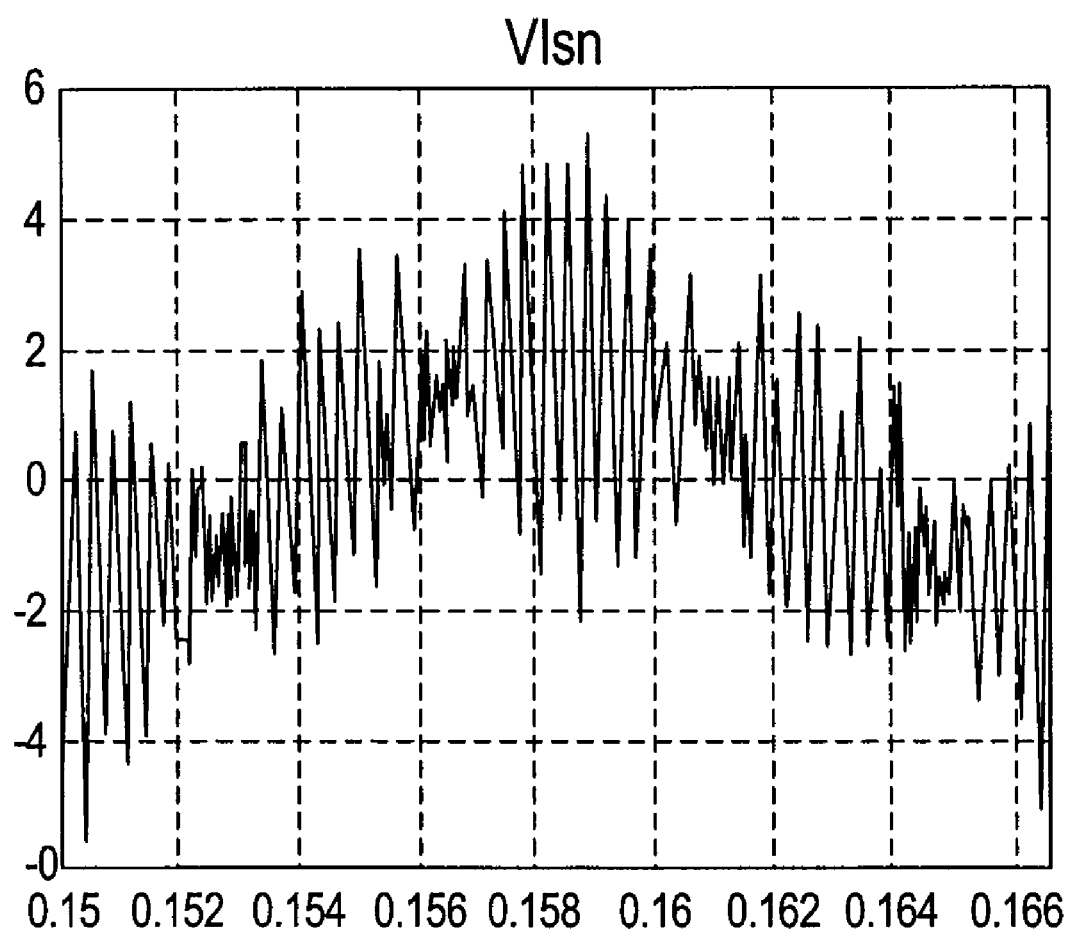
FIG. 37 shows the LISN voltage waveform of a two-level rectifier.
Figure 38:
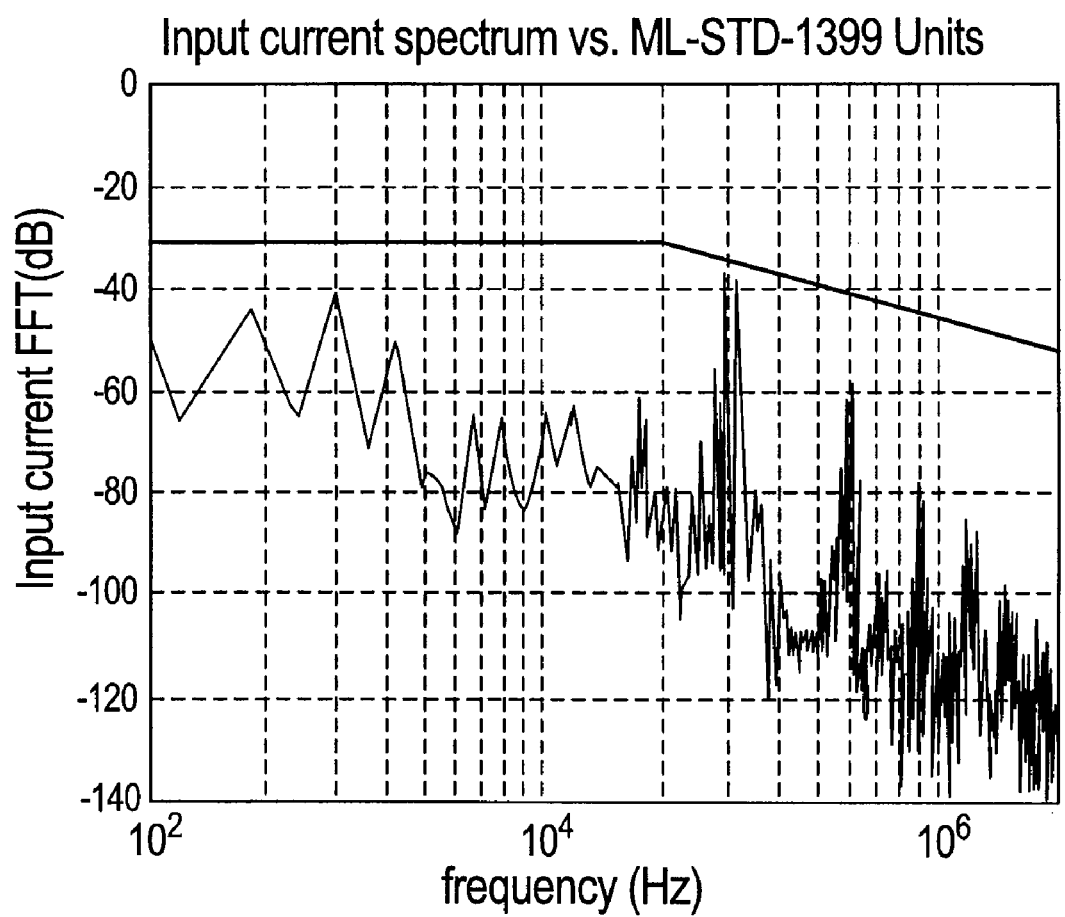
FIG. 38 shows the line current spectrum of a two-level rectifier.
Figure 39:
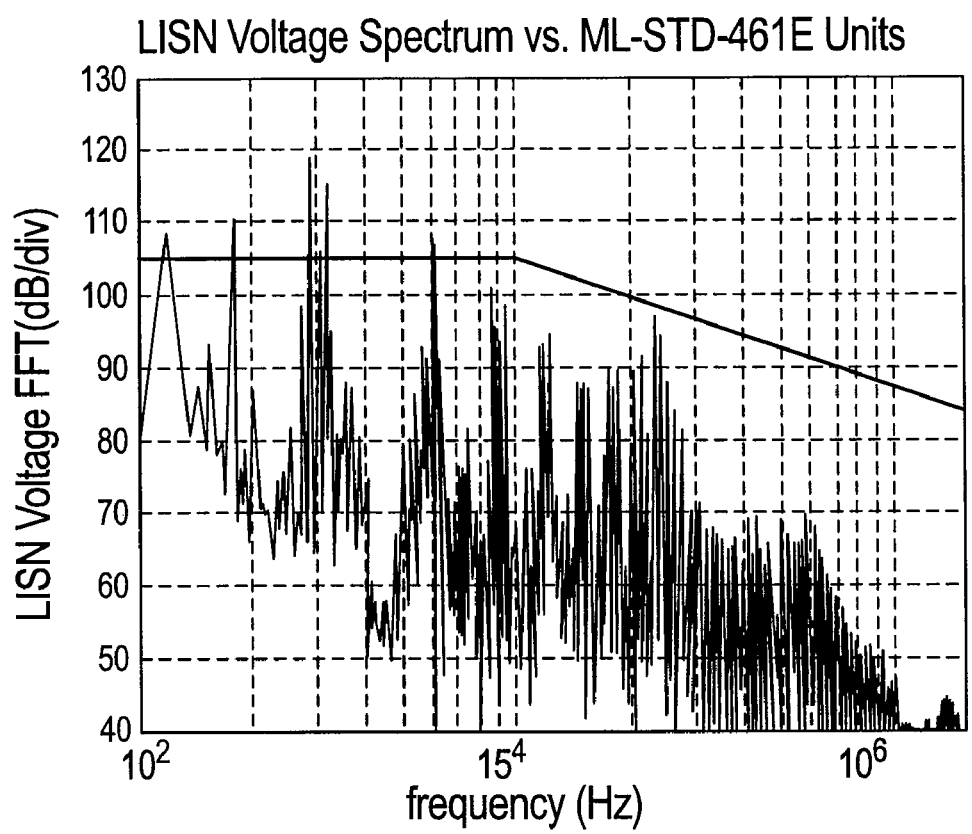
FIG. 39 shows the LISN voltage spectrum of a two-level rectifier.
Figure 40:
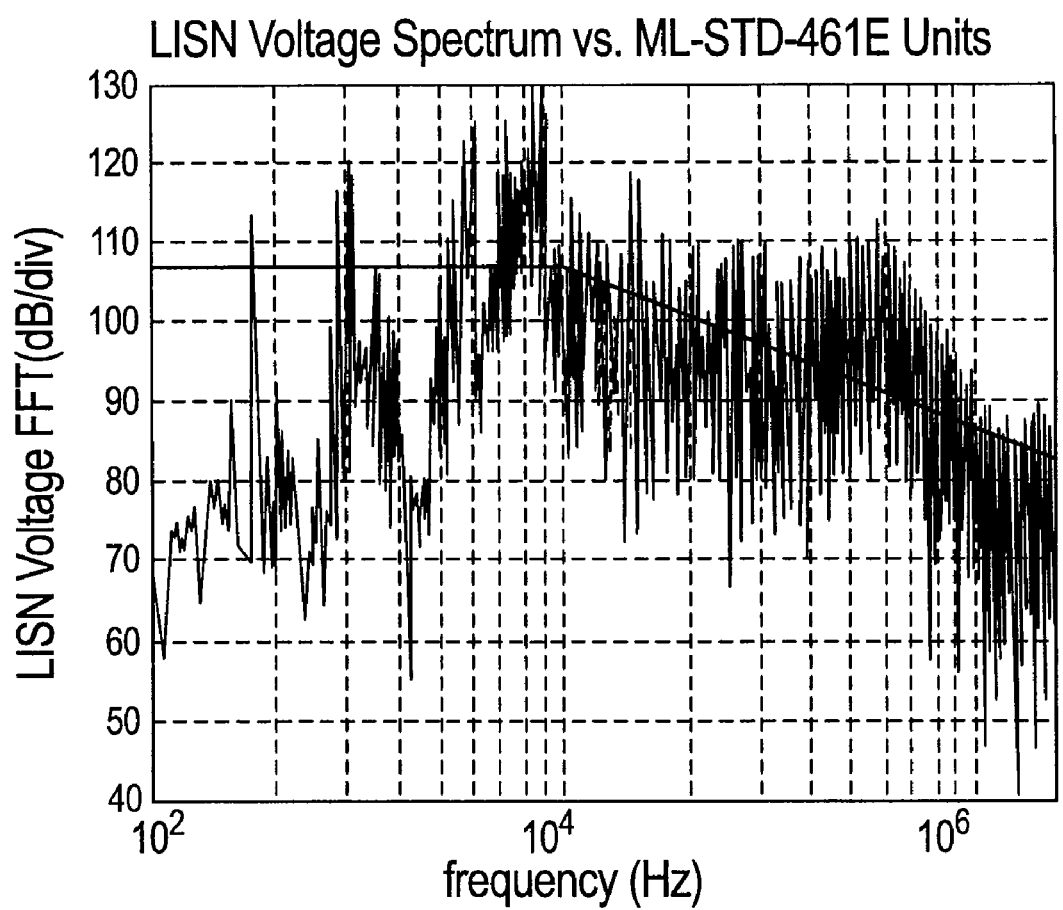
FIG. 40 shows the LISN voltage spectrum of a two-level rectifier with a smaller EMI filter.
Figure 41:
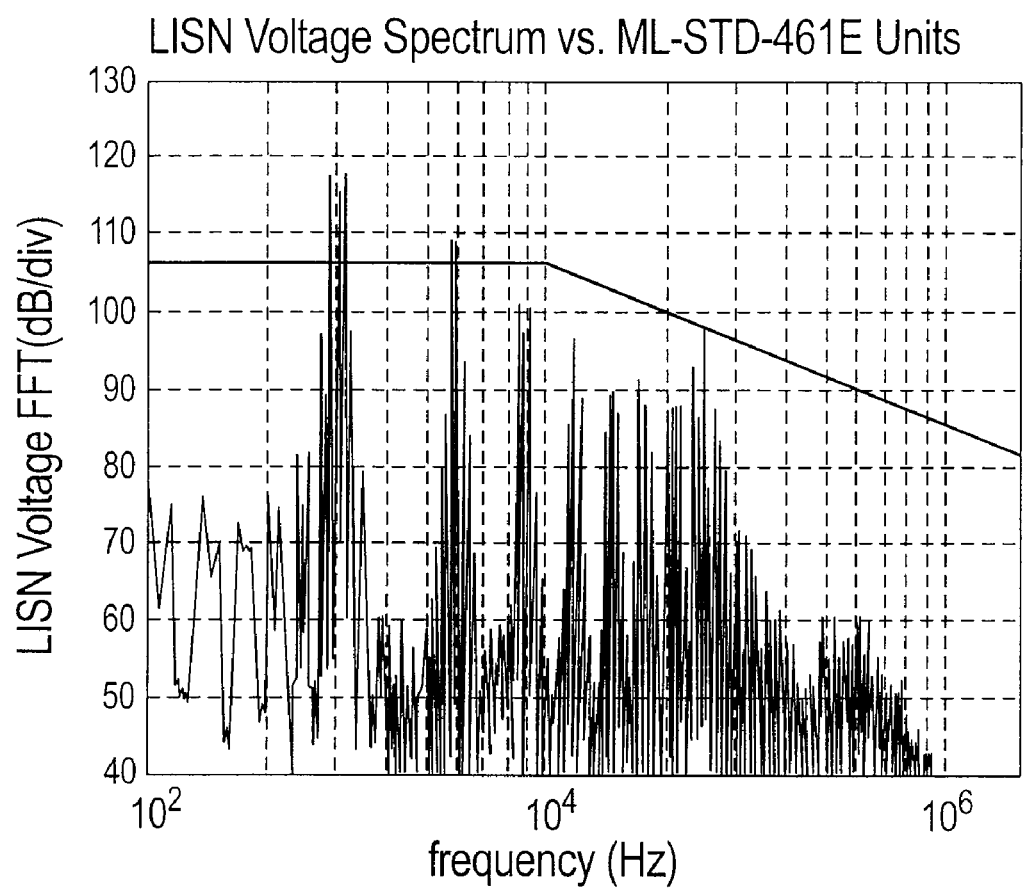
FIG. 41 shows the LISN voltage spectrum of rectifier of FIG. 35.

A conventional two-level rectifier with appropriately sized filter components yields a time domain line current and LISN voltage waveforms shown in FIGS. 36 and 37 respectively. The spectrum of the line current is shown in FIG. 38 and that of the LISN voltage is shown n FIG. 39. The limit lines shown on the spectral plots correspond to MIL-STD-1399 and MIL-STD-461 CE102, respectively, and it can be seen that the specifications are met. However, as discussed above, the EMI filter inductor is prohibitively large. If a smaller (1% of previous size) EMI filter is used in the two-level active rectifier, the MIL-STD-461 CE102 specification is not met. This can be observed from the LISN voltage spectrum shown in FIG. 40.

The rectifier 3500 consistent with the present invention using the above-described zero common mode implementation meets the MIL-STD-1399 and MIL-STD-461 CE102 specifications. The four pole three-level rectifier 3500 is ideally suited to naval ship service interface applications. The rectifier 3500 has three, three-level poles that interconnect to the incoming ship service AC bus without producing common mode voltage or low common mode voltage. Thus, smaller or no EMI filters can be used and the interface specifications are met. The three line connected poles accurately produce sinusoidal currents as well as zero common mode voltage and are not burdened with the additional control function of neutral point balance. The neutral balance function is performed by the fourth pole, which produces balancing currents into the neutral point through a small reactance Lx.

As described above, the control of the fourth pole is radically different from the conventional three pole control schemes. The fourth pole is only switched between the upper and lower buses with a 50% duty cycle and the neutral point state is only selected during transitions. This allows the energy transfer to occur between the upper and lower buses via the fourth pole inductor. Additional control implementations may be incorporated into the fourth pole controls to eliminate low frequency harmonic content in the neutral point voltage.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A three-level neutral point clamped converter comprising:
   a first pole;
   a second pole;
   a third pole;
   a fourth pole,
   each of the first, second, and third poles having a first switch, a second switch, a third switch, and a fourth switch coupled in series between a positive DC bus and a negative DC bus,
   the fourth pole having a first switch and a second switch coupled in series between the positive DC bus and the negative DC bus,
   an AC bus being connected between the second switch and the third switch of the first, second, and third poles,
   a neutral line being connected through a diode between the first switch and the second switch and between the third switch and the fourth switch of the first, second, and third poles,
   the first and second switches defining an upper portion, the third and fourth switches defining a lower portion; and
   a controller that
      switches states of the respective first, second, third, and fourth switches of the first, second, and third poles to produce zero common mode voltage, the fourth pole enabling all neutral point clamped switch states of the first, second, and third poles to be used for producing zero common mode voltage, and
      modulates the first and second switches of the fourth pole to balance the positive DC bus and the negative DC bus.

2. The three-level neutral point clamped converter of claim 1, wherein the converter is an inverter.

3. The three-level neutral point clamped converter of claim 1, wherein the converter is a rectifier.

4. The three-level neutral point clamped converter of claim 1, wherein the controller compensates for the effects of dead time by delaying commutation of a respective one of the first, second, and third poles.

5. The three-level neutral point clamped converter of claim 1, wherein the controller effects production of zero common mode voltage by implementing a two-level modulation scheme and mapping two-level states to three-level states.

6. The three-level neutral point clamped converter of claim 5, wherein the two-level modulation scheme is space vector modulation.

7. The three-level neutral point clamped converter of claim 1, wherein the controller balances the positive DC bus and the negative DC bus by measuring the difference between upper and lower DC link voltages, and commanding either the upper portion or the lower portion of a respective pole to turn on depending on whether charge must be pulled out of the upper portion's DC link or out of the lower portion's DC link to maintain the balance.

8. The three-level neutral point clamped converter of claim 1, wherein the first switch of the first pole includes the first switch and a third switch and the second switch of the fourth pole includes the second switch and a fourth switch, and the neutral line is connected between the third switch and the second switch of the fourth pole through an inductance.

9. A method for controlling a three-level neutral point clamped converter having a first pole, a second pole, a third pole, and a fourth pole, each of the first, second, and third poles having a first switch, a second switch, a third switch, and a fourth switch coupled in series between a positive DC bus and a negative DC bus, the fourth pole having a first switch and a second switch coupled in series between the positive DC bus and the negative DC bus, an AC bus being connected between the second switch and the third switch of the first, second, and third poles, a neutral line being connected through a diode between the first switch and the second switch and between the third switch and the fourth switch of the first, second, and third poles, the first and second switches defining an upper portion, the third and fourth switches defining a lower portion, the method comprising the steps of:
   switching states of the respective first, second, third, and fourth switches of the first, second, and third poles to produce zero common mode voltage, the fourth pole enabling all neutral point clamped switch states of the first, second, and third poles to be used for producing zero common mode voltage; and
   modulating the first and second switches of the fourth pole to balance the positive DC bus and the negative DC bus.

10. The method of claim 9, wherein the converter is an inverter.

11. The method of claim 9, wherein the converter is a rectifier.

12. The method of claim 9, further comprising the step of: compensating for the effects of dead time by delaying commutation of a respective one of the first, second, and third poles.

13. The method of claim 9, wherein switching states to produce zero common mode voltage includes implementing a two-level modulation scheme and mapping two-level states to three-level states.

14. The method of claim 13, wherein the two-level modulation scheme is space vector modulation.

15. The method of claim 9, wherein modulating the first, second, third, and fourth switches of the fourth pole to balance the positive DC bus and the negative DC bus includes measuring the difference between upper and lower DC link voltages, and commanding either the upper portion or the lower portion of a respective pole to turn on depending on whether charge must be pulled out of the upper portion's DC link or out of the lower portion's DC link to maintain the balance.

16. The method of claim 9, wherein the first switch of the first pole includes the first switch and a third switch and the second switch of the fourth pole includes the second switch and a fourth switch, and the neutral line is connected between the third switch and the second switch of the fourth pole through an inductance.

* * * * *